United States Patent
Graf et al.

(10) Patent No.: US 12,498,442 B2
(45) Date of Patent: Dec. 16, 2025

(54) ROBUST ADDRESSING SCHEMA FOR SPATIAL AWARENESS VIA DOPPLER NULL SCANNING (DNS)

(71) Applicant: Rockwell Collins, Inc., Cedar Rapids, IA (US)

(72) Inventors: Joseph T. Graf, Center Point, IA (US); Tj T. Kwon, Marion, IA (US); Eric J. Loren, North Liberty, IA (US); William B. Sorsby, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 298 days.

(21) Appl. No.: 18/196,807

(22) Filed: May 12, 2023

(65) Prior Publication Data

US 2023/0288518 A1    Sep. 14, 2023

Related U.S. Application Data

(63) Continuation-in-part of application No. 18/134,950, filed on Apr. 14, 2023, now Pat. No. 12,032,081, and
(Continued)

(51) Int. Cl.
*H04W 56/00* (2009.01)
*G01S 5/00* (2006.01)
(Continued)

(52) U.S. Cl.
CPC .......... *G01S 5/0027* (2013.01); *G01S 13/583* (2013.01); *G01S 13/62* (2013.01);
(Continued)

(58) Field of Classification Search
CPC ...... G01S 5/0027; G01S 13/583; G01S 13/62; G01S 2205/03; G01S 3/14; G01S 5/0284;
(Continued)

(56) References Cited

U.S. PATENT DOCUMENTS

| | | | |
|---|---|---|---|
| 3,025,519 | A | 3/1962 | Brown et al. |
| 4,134,113 | A | 1/1979 | Powell |

(Continued)

FOREIGN PATENT DOCUMENTS

| | | |
|---|---|---|
| CN | 101330448 A | 12/2008 |
| CN | 101465793 A | 6/2009 |

(Continued)

OTHER PUBLICATIONS

U.S. Appl. No. 17/233,107, filed Apr. 16, 2021, Eric J. Loren.
(Continued)

*Primary Examiner* — Dominic E Rego
(74) *Attorney, Agent, or Firm* — Suiter Swantz IP

(57) ABSTRACT

A node of a multi-node network (e.g., a transmitter (Tx) node or receiver (Rx) node) is disclosed. The node may include a communications interface with antenna elements and a controller. The controller may include one or more processors and have information of own-node velocity and own-node orientation relative to a common reference frame. The node may be time synchronized to apply Doppler corrections associated with the node's own motions relative to the common reference frame. The node may receive an input sequence via a zero or near-zero Doppler path from a source node, the input sequence one of a set possible correlation sequence uniquely identifying the source node. The controller includes a correlator with sub-correlator blocks for breaking the input sequence into a set of N sub-sequences. Based on sequence processing by the sub-correlators, the correlator outputs the decoded input sequence and associated delay metrics.

17 Claims, 18 Drawing Sheets

Related U.S. Application Data a continuation-in-part of application No. 18/130,285, filed on Apr. 3, 2023, which is a continuation-in-part of application No. 17/990,491, filed on Nov. 18, 2022, now Pat. No. 12,335,138, which is a continuation-in-part of application No. 17/957,881, filed on Sep. 30, 2022, and a continuation-in-part of application No. 17/941,907, filed on Sep. 9, 2022, now Pat. No. 12,316,403, which is a continuation-in-part of application No. 17/940,898, filed on Sep. 8, 2022, now Pat. No. 12,366,625, said application No. 17/957,881 is a continuation-in-part of application No. 17/857,920, filed on Jul. 5, 2022, now Pat. No. 12,287,418, said application No. 17/940,898 is a continuation-in-part of application No. 17/857,920, filed on Jul. 5, 2022, now Pat. No. 12,287,418, said application No. 17/957,881 is a continuation-in-part of application No. 17/846,625, filed on Jun. 22, 2022, said application No. 17/857,920 is a continuation of application No. 17/541,703, filed on Dec. 3, 2021, now Pat. No. 12,137,048, said application No. 18/134,950 is a continuation of application No. 17/534,061, filed on Nov. 23, 2021, now Pat. No. 11,665,658, said application No. 17/857,920 is a continuation of application No. 17/534,061, filed on Nov. 23, 2021, now Pat. No. 11,665,658, said application No. 17/541,703 is a continuation-in-part of application No. 17/408,156, filed on Aug. 20, 2021, now Pat. No. 11,737,121, and a continuation-in-part of application No. 17/233,107, filed on Apr. 16, 2021, now Pat. No. 11,726,162, and a continuation-in-part of application No. 17/079,175, filed on Oct. 23, 2020, now Pat. No. 11,304,084, and a continuation-in-part of application No. 17/020,231, filed on Sep. 14, 2020, now Pat. No. 11,296,966, which is a continuation-in-part of application No. 16/987,671, filed on Aug. 7, 2020, now Pat. No. 11,290,942, and a continuation-in-part of application No. 16/698,230, filed on Nov. 27, 2019, now Pat. No. 10,999,778.

(60) Provisional application No. 63/400,138, filed on Aug. 23, 2022, provisional application No. 63/344,445, filed on May 20, 2022.

(51) Int. Cl.
   *G01S 13/58* (2006.01)
   *G01S 13/62* (2006.01)

(52) U.S. Cl.
   CPC ... *H04W 56/0015* (2013.01); *H04W 56/0035* (2013.01); *H04W 56/005* (2013.01)

(58) Field of Classification Search
   CPC . G01S 5/12; H04W 56/0015; H04W 56/0035; H04W 56/005; G08G 5/21; G08G 5/55; G08G 5/723; G08G 5/80; G08G 5/25; G08G 5/53
   See application file for complete search history.

(56) References Cited

U.S. PATENT DOCUMENTS

| | | | |
|---|---|---|---|
| 4,399,531 | A | 8/1983 | Grande et al. |
| 4,438,439 | A | 3/1984 | Shreve |
| 4,806,934 | A | 2/1989 | Magoon |
| 5,706,010 | A | 1/1998 | Franke |
| 5,835,482 | A | 11/1998 | Allen |
| 5,898,902 | A | 4/1999 | Tuzov |
| 6,008,758 | A | 12/1999 | Campbell |
| 6,072,425 | A | 6/2000 | Vopat |
| 6,111,541 | A | 8/2000 | Karmel |
| 6,115,394 | A | 9/2000 | Balachandran et al. |
| 6,148,219 | A | 11/2000 | Engelbrecht et al. |
| 6,195,403 | B1 | 2/2001 | Anderson et al. |
| 6,415,154 | B1 | 7/2002 | Wang et al. |
| 6,496,940 | B1 | 12/2002 | Horst et al. |
| 6,611,773 | B2 | 8/2003 | Przydatek et al. |
| 6,662,229 | B2 | 12/2003 | Passman et al. |
| 6,718,174 | B2 | 4/2004 | Vayanos |
| 6,721,290 | B1 | 4/2004 | Kondylis et al. |
| 6,744,740 | B2 | 6/2004 | Chen |
| 6,845,091 | B2 | 1/2005 | Ogier et al. |
| 7,023,818 | B1 | 4/2006 | Elliott |
| 7,171,476 | B2 | 1/2007 | Maeda et al. |
| 7,242,671 | B2 | 7/2007 | Li et al. |
| 7,272,472 | B1 | 9/2007 | McElreath |
| 7,299,013 | B2 | 11/2007 | Rotta et al. |
| 7,313,401 | B2 | 12/2007 | Karmel |
| 7,343,170 | B1 | 3/2008 | Feeney et al. |
| 7,417,948 | B2 | 8/2008 | Sjöblom |
| 7,418,343 | B1 | 8/2008 | McGraw et al. |
| 7,558,575 | B2 | 7/2009 | Losh et al. |
| 7,573,835 | B2 | 8/2009 | Sahinoglu et al. |
| 7,633,921 | B2 | 12/2009 | Thubert et al. |
| 7,636,061 | B1 | 12/2009 | Thomas et al. |
| 7,639,652 | B1 | 12/2009 | Amis et al. |
| 7,679,551 | B2 | 3/2010 | Petovello et al. |
| 7,698,463 | B2 | 4/2010 | Ogier et al. |
| 7,719,989 | B2 | 5/2010 | Yau |
| 7,729,240 | B1 | 6/2010 | Crane et al. |
| 7,787,450 | B1 | 8/2010 | Chan et al. |
| 7,881,229 | B2 | 2/2011 | Weinstein et al. |
| 7,903,662 | B2 | 3/2011 | Cohn |
| 7,983,239 | B1 | 7/2011 | Weinstein et al. |
| 8,010,287 | B1 | 8/2011 | Frank et al. |
| 8,036,224 | B2 | 10/2011 | Axelsson et al. |
| 8,121,741 | B2 | 2/2012 | Taft et al. |
| 8,138,626 | B2 | 3/2012 | Jonsson et al. |
| 8,159,397 | B2 | 4/2012 | Feller et al. |
| 8,159,954 | B2 | 4/2012 | Larsson et al. |
| 8,217,836 | B1 | 7/2012 | Anderson et al. |
| 8,218,550 | B2 | 7/2012 | Axelsson et al. |
| 8,223,660 | B2 | 7/2012 | Allan et al. |
| 8,223,868 | B2 | 7/2012 | Lee |
| 8,341,289 | B2 | 12/2012 | Hellhake et al. |
| 8,369,445 | B2 | 2/2013 | Hensley |
| 8,396,686 | B2 | 3/2013 | Song et al. |
| 8,490,175 | B2 | 7/2013 | Barton et al. |
| 8,553,560 | B2 | 10/2013 | Axelsson et al. |
| 8,587,770 | B1 | 11/2013 | Johnston et al. |
| 8,599,956 | B1 | 12/2013 | Mitchell |
| 8,614,997 | B1 | 12/2013 | Herder |
| 8,630,291 | B2 | 1/2014 | Shaffer et al. |
| 8,638,008 | B2 | 1/2014 | Baldwin et al. |
| 8,717,230 | B1 | 5/2014 | Fischi et al. |
| 8,717,935 | B2 | 5/2014 | Lindem, III et al. |
| 8,732,338 | B2 | 5/2014 | Hutchison et al. |
| 8,798,034 | B2 | 8/2014 | Aggarwal et al. |
| 8,824,444 | B1 | 9/2014 | Berenberg et al. |
| 8,849,596 | B2 | 9/2014 | Ting et al. |
| 8,867,427 | B2 | 10/2014 | Taori et al. |
| 8,880,001 | B1 | 11/2014 | Hwang et al. |
| 8,909,471 | B1 | 12/2014 | Jinkins et al. |
| 8,913,543 | B2 | 12/2014 | Zainaldin |
| 8,930,044 | B1 | 1/2015 | Peeters et al. |
| 8,942,197 | B2 | 1/2015 | Rudnick et al. |
| 8,964,739 | B1 | 2/2015 | Wisehart |
| 8,989,326 | B2 | 3/2015 | An et al. |
| 9,075,126 | B2 | 7/2015 | Robinson |
| 9,179,475 | B2 | 11/2015 | Koleszar et al. |
| 9,213,387 | B2 | 12/2015 | King et al. |
| 9,246,795 | B2 | 1/2016 | Madaiah et al. |
| 9,264,126 | B2 | 2/2016 | Foster et al. |
| 9,294,159 | B2 | 3/2016 | Duerksen |
| 9,304,198 | B1 | 4/2016 | Doerry et al. |
| 9,325,513 | B2 | 4/2016 | Liu et al. |
| 9,345,029 | B2 | 5/2016 | Monte et al. |

(56) References Cited

U.S. PATENT DOCUMENTS

| | | |
|---|---|---|
| 9,355,564 B1 | 5/2016 | Tyson et al. |
| 9,430,947 B2 | 8/2016 | Richardson et al. |
| 9,435,884 B2 | 9/2016 | Inoue |
| 9,516,513 B2 | 12/2016 | Saegrov et al. |
| 9,523,761 B1 | 12/2016 | Hoffmann et al. |
| 9,544,162 B2 | 1/2017 | Vasseur et al. |
| 9,621,208 B1 | 4/2017 | Snodgrass et al. |
| 9,628,285 B2 | 4/2017 | Császár |
| 9,693,330 B1 | 6/2017 | Snodgrass et al. |
| 9,696,407 B1 | 7/2017 | Greenleaf et al. |
| 9,713,061 B2 | 7/2017 | Ruiz et al. |
| 9,719,803 B2 | 8/2017 | Ratcliff et al. |
| 9,766,339 B2 | 9/2017 | Robinson et al. |
| 9,858,822 B1 | 1/2018 | Gentry |
| 9,883,348 B1 | 1/2018 | Walker et al. |
| 9,979,462 B2 | 5/2018 | Watson et al. |
| 9,979,635 B2 | 5/2018 | Hellhake et al. |
| 10,067,199 B2 | 9/2018 | Eldridge et al. |
| 10,097,469 B2 | 10/2018 | Hui et al. |
| 10,098,051 B2 | 10/2018 | Mosko et al. |
| 10,205,654 B2 | 2/2019 | Choi et al. |
| 10,236,648 B2 | 3/2019 | Irons et al. |
| 10,257,655 B2 | 4/2019 | Cody |
| 10,365,376 B2 | 7/2019 | Lee et al. |
| 10,382,897 B1 | 8/2019 | Lanes et al. |
| 10,455,521 B2 | 10/2019 | Hudson et al. |
| 10,459,074 B1 | 10/2019 | Omer et al. |
| 10,484,837 B2 | 11/2019 | Navalekar et al. |
| 10,509,130 B2 | 12/2019 | Snyder et al. |
| 10,531,500 B2 | 1/2020 | Ulinskas |
| 10,601,684 B2 | 3/2020 | Hashmi et al. |
| 10,601,713 B1 | 3/2020 | Turgeman et al. |
| 10,609,622 B2 | 3/2020 | Bader et al. |
| 10,620,296 B1 | 4/2020 | Ezal et al. |
| 10,622,713 B2 | 4/2020 | Ma |
| 10,650,688 B1 | 5/2020 | DeRoche |
| 10,719,076 B1 | 7/2020 | Gavrilets et al. |
| 10,763,937 B2 | 9/2020 | Kusano et al. |
| 10,785,672 B2 | 9/2020 | Kwan et al. |
| 10,798,053 B2 | 10/2020 | Nolan et al. |
| 10,838,070 B1 | 11/2020 | Chapman et al. |
| 10,871,575 B2 | 12/2020 | Petrovic et al. |
| 10,873,429 B1 | 12/2020 | Kwon et al. |
| 10,908,277 B1 | 2/2021 | Roggendorf et al. |
| 10,931,570 B1 | 2/2021 | Kwon et al. |
| 10,965,584 B1 | 3/2021 | Kwon et al. |
| 10,979,348 B1 | 4/2021 | Kwon et al. |
| 10,993,201 B2 | 4/2021 | Luecke |
| 10,999,778 B1 | 5/2021 | Kwon et al. |
| 11,071,039 B2 | 7/2021 | Fallon et al. |
| 11,073,622 B2 | 7/2021 | Cohen |
| 11,082,324 B2 | 8/2021 | Ramanathan et al. |
| 11,129,078 B2 | 9/2021 | Yates et al. |
| 11,138,044 B2 | 10/2021 | Boehm et al. |
| 11,258,520 B2 | 2/2022 | Goergen et al. |
| 11,280,911 B2 | 3/2022 | Kennedy et al. |
| 11,284,295 B1 | 3/2022 | Kwon et al. |
| 11,290,942 B2 | 3/2022 | Kwon et al. |
| 11,411,613 B2 | 8/2022 | Jorgenson et al. |
| 11,415,664 B2 | 8/2022 | Hammes et al. |
| 11,443,638 B2 | 9/2022 | Byxbe |
| 11,500,111 B2 | 11/2022 | Frederiksen et al. |
| 11,528,675 B2 | 12/2022 | Nagaraja et al. |
| 11,536,850 B2 | 12/2022 | Sharma et al. |
| 11,977,173 B2 | 5/2024 | Loren et al. |
| 12,050,279 B2 | 7/2024 | Stevens et al. |
| 12,078,732 B1 | 9/2024 | Sirianni et al. |
| 12,111,406 B2 | 10/2024 | Sorsby et al. |
| 2002/0018448 A1 | 2/2002 | Amis et al. |
| 2002/0082024 A1 | 6/2002 | Bajikar |
| 2003/0035589 A1 | 2/2003 | Kim |
| 2003/0151513 A1 | 8/2003 | Herrmann et al. |
| 2004/0012859 A1 | 1/2004 | Minefuji |
| 2004/0028016 A1 | 2/2004 | Billhartz |
| 2004/0032363 A1 | 2/2004 | Schantz et al. |
| 2004/0121782 A1 | 6/2004 | Tester |
| 2004/0123228 A1 | 6/2004 | Kikuchi et al. |
| 2004/0192334 A1 | 9/2004 | McBurney et al. |
| 2004/0213239 A1 | 10/2004 | Lin et al. |
| 2004/0246902 A1 | 12/2004 | Weinstein et al. |
| 2005/0025076 A1 | 2/2005 | Chaudhuri et al. |
| 2005/0033789 A1 | 2/2005 | Sirois |
| 2005/0047347 A1* | 3/2005 | Lee .................. H04L 1/20 370/241 |
| 2005/0141545 A1 | 6/2005 | Fein et al. |
| 2005/0192058 A1 | 9/2005 | Jung et al. |
| 2005/0219950 A1 | 10/2005 | Rowe |
| 2006/0010170 A1 | 1/2006 | Lashley et al. |
| 2006/0056421 A1 | 3/2006 | Zaki |
| 2006/0176847 A1 | 8/2006 | Chen et al. |
| 2007/0021122 A1 | 1/2007 | Lane et al. |
| 2007/0086541 A1 | 4/2007 | Moon et al. |
| 2007/0097880 A1 | 5/2007 | Rajsic |
| 2007/0109182 A1 | 5/2007 | Budic |
| 2007/0109979 A1 | 5/2007 | Fu et al. |
| 2007/0222665 A1 | 9/2007 | Koeneman |
| 2007/0223497 A1 | 9/2007 | Elson et al. |
| 2007/0299950 A1 | 12/2007 | Kulkarni |
| 2008/0068250 A1 | 3/2008 | Brandao et al. |
| 2008/0107034 A1 | 5/2008 | Jetcheva et al. |
| 2008/0117904 A1 | 5/2008 | Radha et al. |
| 2008/0158040 A1 | 7/2008 | Stayton et al. |
| 2008/0219204 A1 | 9/2008 | Lee et al. |
| 2008/0273582 A1 | 11/2008 | Gaal et al. |
| 2008/0291945 A1 | 11/2008 | Luo |
| 2008/0310325 A1 | 12/2008 | Yang |
| 2008/0310354 A1 | 12/2008 | Hansen et al. |
| 2009/0086713 A1 | 4/2009 | Luo |
| 2009/0203337 A1 | 8/2009 | Sisley et al. |
| 2009/0207694 A1 | 8/2009 | Guigne et al. |
| 2009/0232049 A1 | 9/2009 | Singh et al. |
| 2009/0233544 A1 | 9/2009 | Oyman et al. |
| 2009/0271054 A1 | 10/2009 | Dokken |
| 2009/0290572 A1 | 11/2009 | Gonia et al. |
| 2009/0303115 A1 | 12/2009 | Alizadeh-Shabdiz |
| 2009/0318138 A1 | 12/2009 | Zeng et al. |
| 2010/0074101 A1 | 3/2010 | Skalecki et al. |
| 2010/0074141 A1 | 3/2010 | Nguyen |
| 2010/0111065 A1 | 5/2010 | Noh et al. |
| 2010/0226450 A1 | 9/2010 | Tanaka |
| 2010/0246660 A1 | 9/2010 | Matsuo et al. |
| 2011/0006913 A1 | 1/2011 | Chen et al. |
| 2011/0013487 A1 | 1/2011 | Zhou et al. |
| 2011/0053494 A1 | 3/2011 | Kobayakawa |
| 2011/0122849 A1 | 5/2011 | Jain et al. |
| 2011/0169684 A1 | 7/2011 | Margolin |
| 2011/0188378 A1 | 8/2011 | Collins et al. |
| 2011/0312279 A1 | 12/2011 | Tsai et al. |
| 2012/0092208 A1 | 4/2012 | LeMire et al. |
| 2012/0098699 A1 | 4/2012 | Calmettes et al. |
| 2012/0168566 A1 | 7/2012 | Lee et al. |
| 2013/0006834 A1 | 1/2013 | Waelbroeck et al. |
| 2013/0069834 A1 | 3/2013 | Duerksen |
| 2013/0094366 A1 | 4/2013 | Lee et al. |
| 2013/0100942 A1 | 4/2013 | Rudnick et al. |
| 2013/0130682 A1 | 5/2013 | Awad et al. |
| 2013/0135137 A1 | 5/2013 | Mulder et al. |
| 2013/0195017 A1 | 8/2013 | Jamadagni et al. |
| 2013/0197835 A1 | 8/2013 | Jonsson et al. |
| 2013/0250808 A1 | 9/2013 | Hui et al. |
| 2014/0017196 A1 | 1/2014 | Han et al. |
| 2014/0018097 A1 | 1/2014 | Goldstein |
| 2014/0029704 A1 | 1/2014 | Becker |
| 2014/0188990 A1 | 7/2014 | Fulks |
| 2014/0229519 A1 | 8/2014 | Dietrich et al. |
| 2014/0236483 A1 | 8/2014 | Beaurepaire et al. |
| 2014/0258201 A1 | 9/2014 | Finlow-Bates |
| 2014/0292568 A1 | 10/2014 | Fleming et al. |
| 2014/0340192 A1 | 11/2014 | Yamada et al. |
| 2015/0010153 A1 | 1/2015 | Robertson |
| 2015/0025818 A1 | 1/2015 | Das et al. |
| 2015/0071332 A1 | 3/2015 | Xu et al. |
| 2015/0222479 A1 | 8/2015 | Kim et al. |
| 2015/0287224 A1 | 10/2015 | Hooper et al. |

(56) References Cited

U.S. PATENT DOCUMENTS

| | | |
|---|---|---|
| 2015/0296335 A1 | 10/2015 | Joshi et al. |
| 2015/0326689 A1 | 11/2015 | Leppänen et al. |
| 2015/0366470 A1 | 12/2015 | Kim et al. |
| 2016/0139241 A1 | 5/2016 | Holz et al. |
| 2016/0150465 A1 | 5/2016 | Jung et al. |
| 2016/0187458 A1 | 6/2016 | Shah et al. |
| 2016/0189381 A1 | 6/2016 | Rhoads |
| 2016/0265968 A1 | 9/2016 | Boutaud |
| 2016/0373997 A1 | 12/2016 | Petersen et al. |
| 2017/0111266 A1 | 4/2017 | Ko |
| 2017/0111771 A1 | 4/2017 | Haque et al. |
| 2017/0134227 A1 | 5/2017 | Song et al. |
| 2017/0149658 A1 | 5/2017 | Rimhagen et al. |
| 2017/0168163 A1 | 6/2017 | Small |
| 2017/0259920 A1 | 9/2017 | Lai et al. |
| 2017/0366223 A1 | 12/2017 | Stofer et al. |
| 2018/0013665 A1 | 1/2018 | Ko et al. |
| 2018/0026475 A1 | 1/2018 | Gelonese et al. |
| 2018/0083730 A1 | 3/2018 | Gulati et al. |
| 2018/0091211 A1 | 3/2018 | Hessler et al. |
| 2018/0098263 A1 | 4/2018 | Luo et al. |
| 2018/0146489 A1 | 5/2018 | Jin et al. |
| 2018/0156919 A1 | 6/2018 | Bieber et al. |
| 2018/0234336 A1 | 8/2018 | Schumm et al. |
| 2018/0302807 A1 | 10/2018 | Chen et al. |
| 2018/0317226 A1 | 11/2018 | Sakoda |
| 2019/0098625 A1 | 3/2019 | Johnson et al. |
| 2019/0222302 A1 | 7/2019 | Lin et al. |
| 2019/0251848 A1 | 8/2019 | Sivanesan et al. |
| 2019/0294165 A1 | 9/2019 | Hofmann et al. |
| 2019/0317207 A1 | 10/2019 | Schroder et al. |
| 2019/0332067 A1 | 10/2019 | Zhao et al. |
| 2019/0349172 A1 | 11/2019 | Zhang |
| 2020/0011968 A1 | 1/2020 | Hammes et al. |
| 2020/0018603 A1 | 1/2020 | Deng et al. |
| 2020/0052997 A1 | 2/2020 | Ramanathan et al. |
| 2020/0092949 A1 | 3/2020 | Donepudi et al. |
| 2020/0196309 A1 | 6/2020 | Amouris |
| 2020/0236607 A1 | 7/2020 | Zhu et al. |
| 2020/0292706 A1 | 9/2020 | Hexsel et al. |
| 2020/0350983 A1 | 11/2020 | Alasti et al. |
| 2020/0371247 A1 | 11/2020 | Marmet |
| 2020/0391061 A1 | 12/2020 | Enejehlm et al. |
| 2020/0396708 A1 | 12/2020 | Bharadwaj et al. |
| 2021/0080967 A1 | 3/2021 | Pettinger et al. |
| 2021/0083917 A1 | 3/2021 | Konishi et al. |
| 2021/0153097 A1 | 5/2021 | Du et al. |
| 2021/0201044 A1 | 7/2021 | Herdade et al. |
| 2021/0302956 A1 | 9/2021 | Sudhakaran et al. |
| 2021/0359752 A1 | 11/2021 | Wang et al. |
| 2021/0385879 A1 | 12/2021 | Mahalingam et al. |
| 2021/0405176 A1 | 12/2021 | Luo |
| 2022/0015101 A1 | 1/2022 | Gallagher et al. |
| 2022/0021702 A1 | 1/2022 | Bouthemy |
| 2022/0030511 A1 | 1/2022 | Wang et al. |
| 2022/0038139 A1 | 2/2022 | Löwenmark et al. |
| 2022/0060959 A1 | 2/2022 | Atungsiri et al. |
| 2022/0069901 A1 | 3/2022 | Tian et al. |
| 2022/0085892 A1 | 3/2022 | Sorge |
| 2022/0086818 A1 | 3/2022 | Nam et al. |
| 2022/0143428 A1 | 5/2022 | Goetz et al. |
| 2022/0159741 A1 | 5/2022 | Hoang et al. |
| 2022/0173799 A1 | 6/2022 | Wigard et al. |
| 2022/0198351 A1 | 6/2022 | Beaurepaire et al. |
| 2022/0268916 A1 | 8/2022 | Nagpal |
| 2022/0286254 A1 | 9/2022 | Cha et al. |
| 2022/0295492 A1 | 9/2022 | Shattil |
| 2022/0317290 A1 | 10/2022 | Kostanic et al. |
| 2022/0334211 A1 | 10/2022 | Loren et al. |
| 2022/0342027 A1 | 10/2022 | Loren et al. |
| 2022/0360320 A1 | 11/2022 | Miao et al. |
| 2022/0365165 A1 | 11/2022 | Kirchner et al. |
| 2022/0368410 A1 | 11/2022 | Ma et al. |
| 2022/0413118 A1 | 12/2022 | Starr et al. |
| 2023/0033690 A1 | 2/2023 | Factor et al. |
| 2023/0057666 A1 | 2/2023 | Kwon et al. |
| 2023/0081728 A1 | 3/2023 | Kwon et al. |
| 2023/0111316 A1 | 4/2023 | Ma et al. |
| 2023/0118153 A1 | 4/2023 | Amorim et al. |
| 2023/0133633 A1 | 5/2023 | Park et al. |
| 2023/0135149 A1 | 5/2023 | Krishnamurthy et al. |
| 2023/0179260 A1 | 6/2023 | Abdelghaffar et al. |
| 2023/0280435 A1 | 9/2023 | Schatz et al. |
| 2023/0280436 A1 | 9/2023 | Loren et al. |
| 2023/0280437 A1 | 9/2023 | Kwon et al. |
| 2023/0288518 A1 | 9/2023 | Graf et al. |
| 2023/0288519 A1 | 9/2023 | Schatz et al. |
| 2023/0288521 A1 | 9/2023 | Kwon et al. |
| 2023/0296716 A1 | 9/2023 | Dean et al. |
| 2023/0379007 A1 | 11/2023 | Kwon et al. |
| 2023/0379008 A1 | 11/2023 | Sorsby et al. |
| 2023/0393229 A1 | 12/2023 | Loren et al. |
| 2024/0151800 A1 | 5/2024 | Stevens et al. |

FOREIGN PATENT DOCUMENTS

| | | |
|---|---|---|
| CN | 101330448 B | 12/2010 |
| CN | 101465793 B | 2/2011 |
| CN | 202257277 U | 5/2012 |
| CN | 101686179 B | 1/2013 |
| CN | 103067286 B | 6/2016 |
| CN | 107645417 A | 1/2018 |
| CN | 110234147 A | 9/2019 |
| CN | 115085799 A | 9/2022 |
| CN | 115688598 A | 2/2023 |
| DE | 102010010935 A1 | 9/2011 |
| EP | 0908022 A2 | 4/1999 |
| EP | 1912392 A2 | 4/2008 |
| EP | 2208084 A4 | 11/2011 |
| EP | 2743726 A1 | 6/2014 |
| EP | 2466964 B1 | 12/2017 |
| EP | 3026961 B1 | 8/2020 |
| GB | 2441610 B | 12/2011 |
| GB | 2542491 A | 3/2017 |
| GB | 2568122 B | 11/2019 |
| GB | 2598610 A | 3/2022 |
| JP | 4290684 B2 | 7/2009 |
| JP | 5164157 B2 | 3/2013 |
| KR | 1020040107702 A | 12/2004 |
| KR | 100568976 B1 | 4/2006 |
| KR | 1020060078814 A | 7/2006 |
| KR | 101231707 B1 | 2/2013 |
| KR | 1020160071964 A | 6/2016 |
| RU | 2718131 C1 | 3/2020 |
| WO | 2008157609 A3 | 3/2009 |
| WO | 2012062091 A1 | 5/2012 |
| WO | 2012165938 A1 | 12/2012 |
| WO | 2015114077 A1 | 8/2015 |
| WO | 2015143604 A1 | 10/2015 |
| WO | 2017101575 A1 | 6/2017 |
| WO | 2018077864 A1 | 5/2018 |
| WO | 2019045767 A1 | 3/2019 |
| WO | 2020117427 A1 | 6/2020 |
| WO | 2020165627 A1 | 8/2020 |
| WO | 2020220233 A1 | 11/2020 |
| WO | 2021251902 A1 | 12/2021 |
| WO | 2022003386 A1 | 1/2022 |
| WO | 2022202858 A1 | 9/2022 |
| WO | 2022221429 A1 | 10/2022 |
| WO | 2022232336 A1 | 11/2022 |
| WO | 2022233042 A1 | 11/2022 |
| WO | 2022233314 A1 | 11/2022 |
| WO | 2023001520 A1 | 1/2023 |
| WO | 2023030622 A1 | 3/2023 |
| WO | 2023031904 A1 | 3/2023 |
| WO | 2023047336 A1 | 3/2023 |
| WO | 2023057655 A1 | 4/2023 |
| WO | 2023067552 A1 | 4/2023 |

(56) References Cited

FOREIGN PATENT DOCUMENTS

| WO | 2023068990 A1 | 4/2023 |
|---|---|---|
| WO | 2023081918 A1 | 5/2023 |

OTHER PUBLICATIONS

U.S. Appl. No. 17/408,156, filed Aug. 20, 2021, Tj T. Kwon.
U.S. Appl. No. 17/534,061, filed Nov. 23, 2021, William B. Sorsby.
U.S. Appl. No. 17/857,920, filed Jul. 5, 2022, Eric J. Loren.
U.S. Appl. No. 63/344,445, filed May 20, 2022, Eric J. Loren.
U.S. Appl. No. 16/369,398, filed Mar. 29, 2019, Kwon.
U.S. Appl. No. 16/987,671, filed Aug. 7, 2021, Kwon et al.
U.S. Appl. No. 17/233,107, filed Apr. 16, 2022, Loren et al.
U.S. Appl. No. 17/541,703, filed Dec. 3, 2021, Kwon et al.
U.S. Appl. No. 17/857,920, filed Jul. 5, 2022, Loren et al.
DSSS in a Nutshell, Basics of Design, Research & Design Hub, Sep. 14, 2020.
Extended Search Report for European Application No. 21188737.7 dated Dec. 10, 2021, 8 pages.
Extended Search Report in European Application No. 21190368.7 dated Jan. 5, 2022, 10 pages.
Kwon et al., "Efficient Flooding with Passive Clustering (PC) in Ad Hoc Networks", Computer Communication Review. 32. 44-56. 10.1145/510726.510730, Aug. 11, 2003, 13 pages.
Martorella, M. et al., Ground Moving Target Imaging via SDAP-ISAR Processing: Review and New Trends. Sensors 2021, 21, 2391. https://doi.org/10.3390/s21072391.
Peng Wang, et al., "Convergence of Satellite and Terrestrial Networks: A Comprehensive Survey networks" IEEEAcess; vol. 4, Dec. 31, 2019.
Pulak K. Chowdhury, et al. "Handover Schemes in Satellite Networks: State-of-the-Art and Future Research Directions" 4th Quarter 2006, vol. 8, No. 4, Oct. 1, 2006.
Seddigh et al., "Dominating sets and neighbor elimination-based broadcasting algorithms in wireless networks", IEE Transactions in Parallel and Distributed Systems, IEEE, USA, vol. 13, No. 1, Jan. 1, 2002 (Jan. 1, 2002), pp. 14-25, XP011094090, ISSN: 1045-9219, DOI 10.1109/71.9800214.
Yi et al., "Passive Clustering in Ad Hoc Networks (PC)", URL: https://tools.ietf,org/html/drafts-yi-manet-pc-00, Nov. 14, 2001, 31 pages.
Seddigh M et al: "Dominating sets and neighbor elimination-based broadcasting algorithms in wireless networks", vol. 13, No. 1, Jan. 1, 2002, pp. 14-25.
Turgut D. et al: "Optimizing clustering algorithm in mobile ad hoc networks using simulated annealing", vol. 3, Mar. 16, 20023, pp. 1492-1497.
Extended European Search Report dated Apr. 4, 2024; European Application No. 21190368.7.

* cited by examiner

| Partial Sequences (N =) | Unique Addresses (N!) | Equal Sub-Sequence Length | Actual Sequence Length | Wasted Symbols |
|---|---|---|---|---|
| 1 | 1 | 16,384 | 16,384 | 0 |
| 2 | 2 | 8,192 | 8,192 | 0 |
| 3 | 6 | 2,730.6667 | 2,730 | -4 |
| 4 | 24 | 682.6667 | 682 | -16 |
| 5 | 120 | 136.5333 | 136 | -64 |
| 6 | 720 | 22.7556 | 22 | -544 |
| 7 | 5,040 | 3.2508 | 3 | -1,264 |

Correlation Sequence 206 (16,384 symbols)

FIG. 2B

ROBUST ADDRESSING SCHEMA FOR SPATIAL AWARENESS VIA DOPPLER NULL SCANNING (DNS)

CROSS-REFERENCE TO RELATED APPLICATIONS

The present application is related to and claims priority from the following US Patent Applications:
(a) U.S. patent application Ser. No. 17/233,107, filed Apr. 16, 2021, which is herein incorporated by reference in its entirety;
(b) PCT Patent Application No. PCT/US22/24653, filed Apr. 13, 2022, which claims priority to U.S. patent application Ser. No. 17/233,107, filed Apr. 16, 2021, all of which are herein incorporated by reference in its entirety;
(c) U.S. patent application Ser. No. 17/408,156, filed Aug. 20, 2021, which claims priority to U.S. patent application Ser. No. 17/233,107, filed Apr. 16, 2021, all of which are herein incorporated by reference in its entirety;
(d) U.S. patent application Ser. No. 17/541,703, filed Dec. 3, 2021, which is herein incorporated by reference in its entirety, which claims priority to:
  U.S. patent application Ser. No. 17/408,156, filed Aug. 20, 2021, which is herein incorporated by reference in its entirety; and
  U.S. patent application Ser. No. 17/233,107, filed Apr. 16, 2021, all of which is herein incorporated by reference in its entirety;
(e) U.S. patent application Ser. No. 17/534,061, filed Nov. 23, 2021, which is herein incorporated by reference in its entirety;
(f) U.S. Patent Application No. 63/344,445, filed May 20, 2022, which is herein incorporated by reference in its entirety;
(g) U.S. patent application Ser. No. 17/857,920, filed Jul. 5, 2022, which is herein incorporated by reference in its entirety;
(h) U.S. Patent Application No. 63/400,138, filed Aug. 23, 2022, which is herein incorporated by reference in its entirety;
(i) U.S. patent application Ser. No. 17/940,898, filed Sep. 8, 2022, which is herein incorporated by reference in its entirety;
(j) U.S. patent application Ser. No. 17/941,907, filed Sep. 9, 2022, which is herein incorporated by reference in its entirety;
(k) U.S. patent application Ser. No. 17/957,881, filed Sep. 30, 2022, which is herein incorporated by reference in its entirety;
(l) U.S. patent application Ser. No. 17/990,491, filed Nov. 18, 2022, which is herein incorporated by reference in its entirety;
(m) U.S. patent application Ser. No. 18/130,285, filed Apr. 3, 2023, which is herein incorporated by reference in its entirety; and
(n) U.S. patent application Ser. No. 18/134,950, filed Apr. 14, 2023, which is incorporated by reference in its entirety.

BACKGROUND

Mobile Ad-hoc NETworks (MANET; e.g., "mesh networks") are known in the art as quickly deployable, self-configuring wireless networks with no pre-defined network topology. Each communications node within a MANET is presumed to be able to move freely. Additionally, each communications node within a MANET may be required to forward (relay) data packet traffic. Data packet routing and delivery within a MANET may depend on a number of factors including, but not limited to, the number of communications nodes within the network, communications node proximity and mobility, power requirements, network bandwidth, user traffic requirements, timing requirements, and the like.

MANETs face many challenges due to the limited network awareness inherent in such highly dynamic, low-infrastructure communication systems. Given the broad ranges in variable spaces, the challenges lie in making good decisions based on such limited information. For example, in static networks with fixed topologies, protocols can propagate information throughout the network to determine the network structure, but in dynamic topologies this information quickly becomes stale and must be periodically refreshed. It has been suggested that directional systems are the future of MANETs, but the potential of this future has not as yet been fully realized. In addition to topology factors, fast-moving platforms (e.g., communications nodes moving relative to each other) experience a frequency Doppler shift (e.g., offset) due to the relative radial velocity between each set of nodes. This Doppler frequency shift often limits receive sensitivity levels which can be achieved by a node within a mobile network.

SUMMARY

In a first aspect, a receiver (Rx) node of a MANET or other like multi-node network for communications or for sharing situational awareness information is disclosed. In embodiments, the Rx node includes a communications interface with antenna element/s and a controller including one or more processors. The Rx node (e.g., and each node of the MANET, via its controller) has knowledge of own-node velocity and/or own-node orientation relative to a stationary common inertial reference frame. The Rx node is in motion relative to at least one source node (e.g., a transmitting (Tx) node of the MANET) and relative to the common reference frame (which frame is known to the Rx node and the source node prior to the Rx node receiving transmissions from the source node). The Rx node (e.g., along with other MANET nodes) is time synchronized to apply Doppler corrections based on the Rx node's own motions relative to the common reference frame. The Rx node may receive a zero or near-zero Doppler pulse (e.g., free or nearly free of Doppler-shift interference) along a zero or near-zero Doppler path from source node to Rx node according to known time intervals. The zero/near-zero Doppler pulse may carry a correlation sequence of S symbols (wherein S is an integer). The Rx node includes a correlator segmented into N sub-correlator blocks (wherein N is an integer and N≤S), and the correlation sequence is segmented into a set of N sub-sequences (the arrangement of sub-sequences uniquely identifying the source node). Each sub-correlator block receives the correlation sequence as the sequence of N segments or sub-sequences and provides the correlator a delay value indicative of a receipt of each sub-sequence of the set (e.g., until all sub-sequences are received, in the appropriate order). Based on the delay values received from each sub-correlator block, the correlator outputs the decoded correlation sequence (e.g., the decoded set of sub-segments in the correct order) and a cumulative delay value associated with Doppler time error to be corrected.

In some embodiments, at least two of the set of N sub-sequences have unequal symbol lengths (e.g., not all sub-segments are of equal length).

In some embodiments, the correlation sequence is one of N! possible correlation sequences (e.g., representing all possible permutations of the N sub-sequences).

In some embodiments, Doppler corrections are in both the frequency and time domains.

In some embodiments, the zero or near-zero Doppler path is not known to the Rx node or source node prior to the Rx node receiving the zero or near-zero Doppler pulse.

In some embodiments, the common reference frame is a two-dimensional (2D) stationary common inertial reference frame.

In some embodiments, the common reference frame is a three-dimensional (3D) stationary common inertial reference frame.

In some embodiments, the antenna elements are directional or omnidirectional.

In a further aspect, a system of a transmitter (Tx) node and receiver (Rx) node of a MANET or other like multi-node network is disclosed. In embodiments, each of the Tx and Rx nodes include a communications interface with antenna element/s and a controller including one or more processors. Each node has knowledge of own-node velocity and/or own-node orientation relative to a stationary common inertial reference frame. The Tx and Rx node are in motion relative to each other (e.g., stationary Tx node/mobile Rx node, stationary Rx node/mobile Tx node, mobile Tx and Rx nodes) and relative to the common reference frame (which frame is known to the Tx and Rx nodes prior to the Tx node transmitting to the Rx node, and the Rx node receiving transmissions from the Tx node). Each node is time synchronized to apply Doppler corrections based on the node's own motions relative to the common reference frame. For example, the Tx node applies Doppler corrections for a set of azimuthal angles across a multi-pulse Doppler group, each direction corresponding to an azimuthal angle of the group indicative of a zero or near-zero Doppler time error known to the Rx node due to the time synchronization. Similarly, the Rx node applies Doppler corrections inversely to the Doppler corrections applied by the Tx node. The Rx node may receive a zero or near-zero Doppler pulse (e.g., free or nearly free of Doppler-shift interference) along a zero or near-zero Doppler path from source node to Rx node according to known time intervals. The zero/near-zero Doppler pulse may carry a correlation sequence of S symbols (wherein S is an integer). The Rx node includes a correlator segmented into N sub-correlator blocks (wherein N is an integer and N≤S), and the correlation sequence is segmented into a set of N sub-sequences (the arrangement of sub-sequences uniquely identifying the source node). Each sub-correlator block receives the correlation sequence as the sequence of N segments or sub-sequences and provides the correlator a delay value indicative of a receipt of each sub-sequence of the set (e.g., until all sub-sequences are received, in the appropriate order). Based on the delay values received from each sub-correlator block, the correlator outputs the decoded correlation sequence (e.g., the decoded set of sub-segments in the correct order) and a cumulative delay value associated with Doppler time error to be corrected.

In some embodiments, at least two of the set of N sub-sequences have unequal symbol lengths (e.g., not all sub-segments are of equal length).

In some embodiments, the correlation sequence is one of N! possible correlation sequences (e.g., representing all possible permutations of the N sub-sequences).

In some embodiments, Doppler corrections are in both the frequency and time domains.

In some embodiments, Doppler corrections for azimuthal angles across the multi-pulse Doppler group are in the frequency domain, and Doppler corrections with respect to the zero or near-zero Doppler pulse are in the time domain.

In some embodiments, the zero or near-zero Doppler path is not known to either the Tx node or the Rx node prior to transmission of the zero or near-zero Doppler pulse from the Tx node to the Rx node.

In some embodiments, the common reference frame is a two-dimensional (2D) stationary common inertial reference frame.

In some embodiments, the common reference frame is a three-dimensional (3D) stationary common inertial reference frame.

In some embodiments, the antenna elements are directional or omnidirectional.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims.

FIG. 2B is a table showing characteristics of a set of sub-correlations associated with the correlator of FIG. 2A.

DETAILED DESCRIPTION

Figure 1:
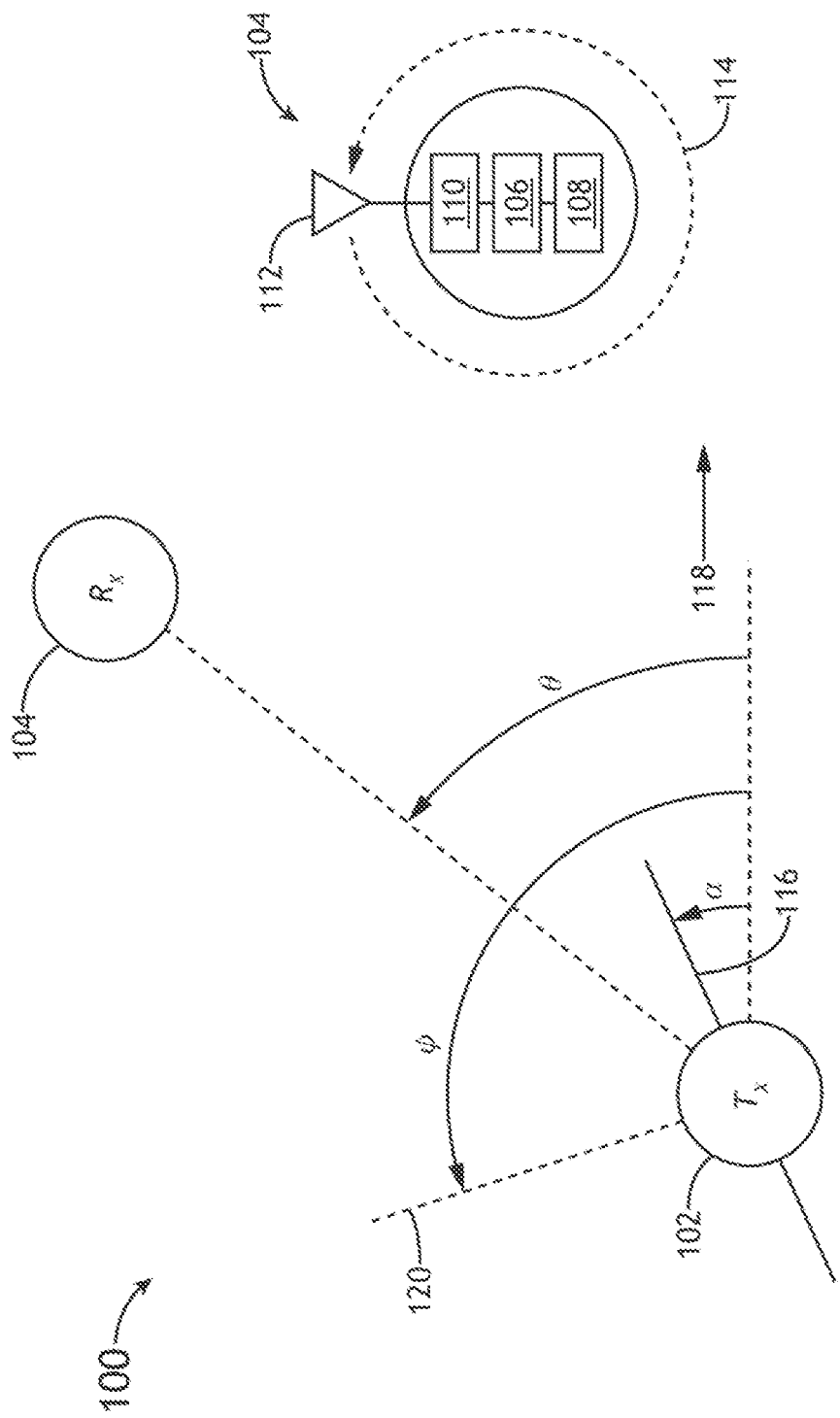
FIG. 1 is a diagrammatic illustration of two nodes in a simplified mobile ad hoc network (MANET) and individual nodes thereof according to example embodiments of this disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment", "in embodiments" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

Broadly speaking, embodiments of the inventive concepts disclosed herein are directed to methods and systems for robust addressing via time-domain pseudorandom number (PN) correlation sequences. For example, nodes communicating within a mobile ad hoc network (MANET) or like communications network may achieve higher signal acquisition and detection sensitivity (e.g., consistent with longer correlation schemes) and guard against spoofing and multipath effects by breaking up longer correlation schemes into sets of sub-sequences or sequence segments detectable by sub-correlator blocks within the correlators of receiving nodes. A longer correlation sequence may be broken down into a set of permutations of the possible arrangements of its component segments, each component segment capable of uniquely identifying the source node transmitting the sequence. and providing an opportunity for Doppler correction in the time domain.

It is noted that U.S. patent application Ser. No. 17/857, 920, filed Jul. 5, 2022, is at least partially reproduced by at least some (or all) of the illustrations of FIGS. 1 and 5A-10 and at least some (or all) of the corresponding language for FIGS. 1 and 5A-10 below.

For example, at least some examples of Doppler nulling methods and systems may be better understood, in a non-limiting manner, by reference to FIGS. 1 and 5A-10. Such embodiments and examples are provided for illustrative purposes and are not to be construed as necessarily limiting. For instance, in embodiments the transmitter node may be stationary rather than moving and/or vice versa. Moreover, and stated for purposes of navigating the disclosure only and not to be construed as limiting, descriptions that may relate to other language not necessarily reproduced from U.S. patent application Ser. No. 17/857,920 include the discussion and figures after FIGS. 1 and 5A-10.

Referring generally to FIGS. 1 and 5A-10, in some embodiments, a stationary receiver may determine a cooperative transmitter's direction and velocity vector by using a Doppler null scanning approach in two dimensions. A benefit of the approach is the spatial awareness without exchanging explicit positional information. Other benefits include discovery, synchronization, and Doppler corrections which are important for communications. Some embodiment may combine coordinated transmitter frequency shifts along with the transmitter's motion induced Doppler frequency shift to produce unique net frequency shift signal characteristics resolvable using a stationary receiver to achieve spatial awareness. Further, some embodiment may include a three-dimensional (3D) approach with the receiver and the transmitter in motion.

Some embodiments may use analysis performed in a common reference frame (e.g., a common inertial reference frame, such as the Earth, which may ignore the curvature of Earth), and it is assumed that the communications system for each of the transmitter and receiver is informed by the platform of its own velocity and orientation. The approach described herein can be used for discovery and tracking, but the discussion here focuses on discovery which is often the most challenging aspect.

The meaning of the 'Doppler Null' can be explained in part through a review of the two-dimensional (2D) case without the receiver motion, and then may be expounded on by a review of adding the receiver motion to the 2D case, and then including receiver motion in the 3D case.

The Doppler frequency shift of a communications signal is proportional to the radial velocity between transmitter and receiver, and any significant Doppler shift is typically a hindrance that should be considered by system designers. In contrast, some embodiments utilize the Doppler effect to discriminate between directions with the resolution dictated by selected design parameters. Furthermore, such embodiments use the profile of the net frequency shift as the predetermined 'Null' direction scans through the angle space. The resultant profile is sinusoidal with an amplitude that provides the transmitter's speed, a zero net frequency shift when the 'Null' direction aligns with the receiver, and a minimum indicating the direction of the transmitter's velocity. It should be noted that that the transmitter cannot correct for Doppler in all directions at one time so signal characteristics are different in each direction and are different for different transmitter velocities as well. It is exactly these characteristics that the receiver uses to determine spatial awareness. The received signal has temporal spatial characteristics that can be mapped to the transmitter's direction and velocity. This approach utilizes the concept of a 'Null' which is simply the direction where the transmitter perfectly corrects for its own Doppler shift. The same 'Nulling' protocol runs on each node and scans through all directions, such as via a scanning sequence of a protocol. Here we arbitrarily illustrate the scanning with discrete successive steps of 10 degrees but in a real system; however, it should be understood that any suitable step size of degrees may be used for Doppler null scanning.

As already mentioned, one of the contributions of some embodiments is passive spatial awareness. Traditionally, spatial information for neighbor nodes (based on a global positioning system (GPS) and/or gyros and accelerometers) can be learned via data communication. Unfortunately, spatial awareness via data communication, referred to as active spatial awareness is possible only after communication has already been established, not while discovering those neighbor nodes. Data communication is only possible after the signals for neighbor nodes have been discovered, synchronized and Doppler corrected. In contrast, in some embodiments, the passive spatial awareness described herein may be performed using only synchronization bits associated with acquisition. This process can be viewed as physical layer overhead and typically requires much lower bandwidth compared to explicit data transfers. The physical layer overheads for discovery, synchronization and Doppler correction have never been utilized for topology learning for upper layers previously.

Traditionally, network topology is harvested via a series of data packet exchanges (e.g., hello messaging and link status advertisements). Passive spatial awareness may eliminate hello messaging completely and provide a wider local topology which is beyond the coverage of hello messaging. By utilizing passive spatial awareness, highly efficient mobile ad hoc networking (MANET) is possible. Embodiments may improve the functioning of a network itself.

Passive spatial awareness may provide benefits above and beyond MANET or communications implementations, however. For example, situational awareness via Doppler null scanning may be applied to fixed-receiver and mobile-transmitter as well as fixed-transmitter and mobile-receiver systems (e.g., replacing TACAN, TCAS, VOR/DME, and other radionavigational beacons and stations), or systems where both transmitters and receivers are mobile (e.g., friend/foe identification and station-keeping between mobile platforms).

Referring to FIG. 1, a multi-node network 100 is disclosed. The multi-node network 100 may include multiple communications nodes, e.g., a transmitter (Tx) node 102 and a receiver (Rx) node 104.

In embodiments, the multi-node network 100 may include any multi-node network known in the art. For example, the multi-node network 100 may include a mobile ad-hoc network (MANET) in which the Tx and Rx nodes 102, 104 (as well as every other communications node within the multi-node network) is able to move freely and independently. Similarly, the Tx and Rx nodes 102, 104 may include any communications node known in the art which may be communicatively coupled. In this regard, the Tx and Rx nodes 102, 104 may include any communications node known in the art for transmitting/transceiving data packets. For example, the Tx and Rx nodes 102, 104 may include, but are not limited to, radios (such as on a vehicle or on a person), mobile phones, smart phones, tablets, smart watches, laptops, and the like. In embodiments, the Rx node 104 of the multi-node network 100 may each include, but are not limited to, a respective controller 106 (e.g., control processor), memory 108, communication interface 110, and antenna elements 112. (In embodiments, all attributes, capabilities, etc. of the Rx node 104 described below may similarly apply to the Tx node 102, and to any other communication node of the multi-node communication network 100.)

In embodiments, the controller 106 provides processing functionality for at least the Rx node 104 and can include any number of processors, micro-controllers, circuitry, field programmable gate array (FPGA) or other processing systems, and resident or external memory for storing data, executable code, and other information accessed or generated by the Rx node 104. The controller 106 can execute one or more software programs embodied in a non-transitory computer readable medium (e.g., memory 108) that implement techniques described herein. The controller 106 is not limited by the materials from which it is formed or the processing mechanisms employed therein and, as such, can be implemented via semiconductor(s) and/or transistors (e.g., using electronic integrated circuit (IC) components), and so forth.

In embodiments, the memory 108 can be an example of tangible, computer-readable storage medium that provides storage functionality to store various data and/or program code associated with operation of the Rx node 104 and/or controller 106, such as software programs and/or code segments, or other data to instruct the controller 106, and possibly other components of the Rx node 104, to perform the functionality described herein. Thus, the memory 108 can store data, such as a program of instructions for operating the Rx node 104, including its components (e.g., controller 106, communication interface 110, antenna elements 112, etc.), and so forth. It should be noted that while a single memory 108 is described, a wide variety of types and combinations of memory (e.g., tangible, non-transitory memory) can be employed. The memory 108 can be integral with the controller 106, can comprise stand-alone memory, or can be a combination of both. Some examples of the memory 108 can include removable and non-removable memory components, such as random-access memory (RAM), read-only memory (ROM), flash memory (e.g., a secure digital (SD) memory card, a mini-SD memory card, and/or a micro-SD memory card), solid-state drive (SSD) memory, magnetic memory, optical memory, universal serial bus (USB) memory devices, hard disk memory, external memory, and so forth.

In embodiments, the communication interface 110 can be operatively configured to communicate with components of the Rx node 104. For example, the communication interface 110 can be configured to retrieve data from the controller 106 or other devices (e.g., the Tx node 102 and/or other nodes), transmit data for storage in the memory 108, retrieve data from storage in the memory, and so forth. The communication interface 110 can also be communicatively coupled with the controller 106 to facilitate data transfer between components of the Rx node 104 and the controller 106. It should be noted that while the communication interface 110 is described as a component of the Rx node 104, one or more components of the communication interface 110 can be implemented as external components communicatively coupled to the Rx node 104 via a wired and/or wireless connection. The Rx node 104 can also include and/or connect to one or more input/output (I/O) devices. In embodiments, the communication interface 110 includes or is coupled to a transmitter, receiver, transceiver, physical connection interface, or any combination thereof.

It is contemplated herein that the communication interface 110 of the Rx node 104 may be configured to communicatively couple to additional communication interfaces 110 of additional communications nodes (e.g., the Tx node 102) of the multi-node network 100 using any wireless communication techniques known in the art including, but not limited to, GSM, GPRS, CDMA, EV-DO, EDGE, WiMAX, 3G, 4G, 4G LTE, 5G, WiFi protocols, RF, LoRa, and the like.

In embodiments, the antenna elements 112 may include directional or omnidirectional antenna elements capable of being steered or otherwise directed (e.g., via the communications interface 110) for spatial scanning in a full 360-degree arc (114) relative to the Rx node 104 (or even less than a full 360-degree arc).

In embodiments, the Tx node 102 and Rx node 104 may one or both be moving in an arbitrary direction at an arbitrary speed, and may similarly be moving relative to each other. For example, the Tx node 102 may be moving relative to the Rx node 104 according to a velocity vector 116 ($|\vec{V_T}|$), at a relative velocity $V_T$ and a relative angular direction (an angle $\alpha$ relative to an arbitrary direction 118 (e.g., due east); $\theta$ may be the angular direction of the Rx node relative to due east.

In embodiments, the Tx node 102 may implement a Doppler nulling protocol. For example, the Tx node 102 may adjust its transmit frequency to counter the Doppler frequency offset such that there is no net frequency offset (e.g., "Doppler null") in a Doppler nulling direction 120 (e.g., at an angle $\phi$ relative to the arbitrary direction 118). The transmitting waveform (e.g., the communications interface 110 of the Tx node 102) may be informed by the platform (e.g., the controller 106) of its velocity vector and orientation (e.g., a, $|\vec{V_T}|$) and may adjust its transmitting frequency to remove the Doppler frequency shift at each Doppler nulling direction 120 and angle $\phi$.

To illustrate aspects of some embodiments, we show the 2D dependence of the net frequency shift for a stationary receiver as a function of Null direction across the horizon, as shown in a top-down view of FIG. 1, where the receiver node 104 is stationary and positioned $\theta$ from east relative to the transmitter, the transmitter node 102 is moving with a speed $|\vec{V_T}|$ and direction $\alpha$ from east and a snapshot of the scanning $\phi$ which is the 'Null' direction, exemplarily shown as 100 degrees in this picture.

The Doppler shift is a physical phenomenon due to motion and can be considered as a channel effect. In this example the transmitter node 102 is the only moving object, so it is the only source of Doppler shift. The Doppler frequency shift as seen by the receiver node 104 due to the transmitter node 102 motion is:

$$\frac{\Delta f_{DOPPLER}}{f} = \frac{|\vec{V_T}|}{c}\cos(\theta - \alpha),$$

where c is the speed of light.

The other factor is the transmitter frequency adjustment term that should exactly compensate the Doppler shift when the 'Null' direction aligns with the receiver direction. It is the job of the transmitter node 102 to adjust its transmit frequency according to its own speed ($|\vec{V_T}|$), and velocity direction $\alpha$. That transmitter frequency adjustment ($\Delta f_T$) is proportional to the velocity projection onto the 'Null' direction $\phi$ (120) and is:

$$\frac{\Delta f_T}{f} = -\frac{|\vec{V_T}|}{c}\cos(\varphi - \alpha).$$

The net frequency shift seen by the receiver is the sum of the two terms:

$$\frac{\Delta f_{net}}{f} = \frac{|\vec{V_T}|}{c}[\cos(\theta - \alpha) - \cos(\varphi - \alpha)].$$

It is assumed that the velocity vector and the direction changes slowly compared to the periodic measurement of $\Delta f_{net}$. Under those conditions, the unknown parameters (from the perspective of the receiver node 104) of $\alpha$, $|\vec{V_T}|$, and $\theta$ are constants.

Furthermore, it is assumed that the receiver node 104 has an implementation that resolves the frequency of the incoming signal, as would be understood to one of ordinary skill in the art.

Examples of Doppler nulling methods include, but are not limited to, methods and other descriptions (e.g., at least some theory and mathematical basis) are disclosed in U.S. patent application Ser. No. 17/233,107, filed Apr. 16, 2021, which is hereby incorporated by reference in its entirety; U.S. patent application Ser. No. 17/534,061, filed Nov. 23, 2021, which is hereby incorporated by reference in its entirety; and U.S. patent application Ser. No. 17/857,920, filed Jul. 5, 2022, which is hereby incorporated by reference in its entirety. In embodiments, doppler nulling methods allow for benefits such as, but not limited to, relatively quickly and/or efficiently detecting transmitter nodes and determining transmitter node attributes (e.g., transmitter node speed, transmitter node bearing, relative bearing of transmitter node relative to receiver node, relative distance of transmitter node relative to receiver node, and the like).

Broadly speaking, embodiments of the inventive concepts disclosed herein are directed to an addressing scheme for Doppler nulling correlation, particularly in the time domain. For example, correlation for Doppler null scanning (DNS) and/or Doppler nulling spatial awareness (DNSA) may involve lengthy pseudorandom number (PN) sequences (e.g., or transmission security (TRANSEC) sequences). However, DNS/DNSA does not provide a means for distinguishing individual nodes within a MANET or other network. As a result, the MANET may be vulnerable to spoofing and multipath effects, wherein spoofed correlation results may be interpreted as originating from a legitimate node or wherein a transmission may arrive at a receiving node from multiple nodes, e.g., the originating node as well as relay nodes.

Embodiments of the inventive concepts disclosed herein may guard against spoofing and multipath effects by subdividing the DNS/DNSA correlator bank, as well as the robust correlation sequence, into a set of sub-correlator blocks and correlation segments (e.g., sub-correlations derived from the original correlation sequence). By segmenting the correlator bank and correlation sequence, the segments may be reordered in various permutations to provide a unique identifying address for each node. While the strength of each individual address may be reduced as the number of segments increases (e.g., and the length of each individual segment decreases), coherent combination of correlator segments may provide strong correlation with little or no degradation in performance.

Figure 2A:
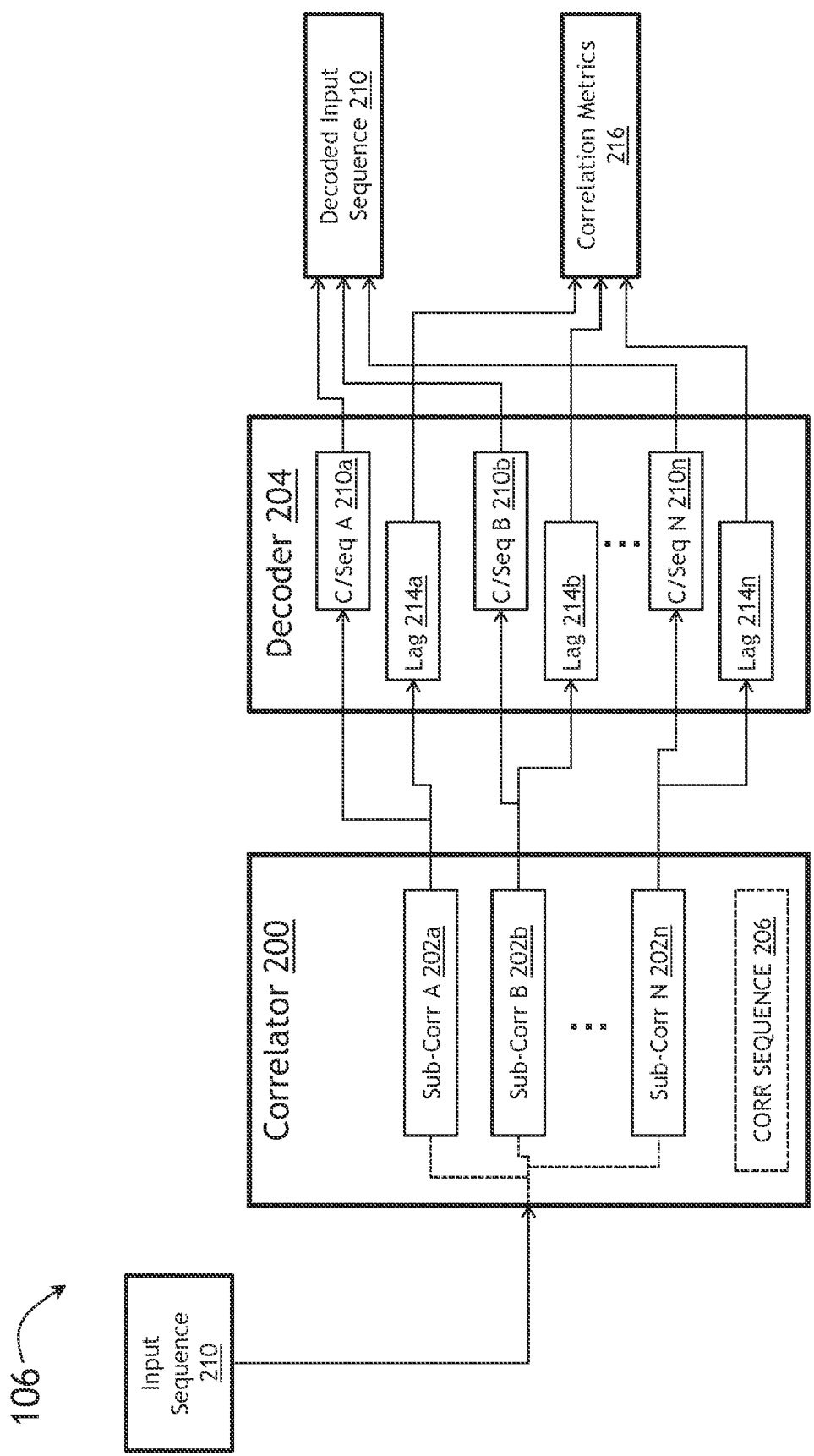
FIG. 2A is a block diagram of a correlator of a receiver node according to example embodiments of this disclosure.

Referring now to FIG. 2A, a controller 106 is shown. The controller 106 may be implemented in the Rx node 104 as shown by FIG. 1, as well as the Tx node 102 and any other node of the multi-node network 100 shown and disclosed herein.

In embodiments, the controller 106 may incorporate a correlator 200 having N sub-correlator blocks 202a, 202b, . . . 202n and a decoder 204. For example, the correlator 200 may more effectively provide signal acquisition and detection sensitivity (e.g., correcting for Doppler time shift error (1300, FIG. 13) in the time domain, when a zero or near-zero Doppler path is achieved as described above) by breaking up a long correlation sequence 206 (e.g., input sequence, PN sequence, bit sequence) into a set of N segments (e.g., partial correlations, sub-correlations) derived from the original correlation sequence.

In embodiments, by breaking down the original correlation sequence 206 into a set of N segments, the single correlation sequence may be used to create N! unique addresses, e.g., each unique address capable of identifying a Tx node 102 and corresponding to an order in which the set of N segments is received. For example, if the correlation sequence 206 is broken up into a set of three (N=3) segments (segment A, segment B, segment C), the component symbols of the correlation sequence may be arranged into 3!=6 unique addresses (ABC, ACB, BAC, BCA, CAB, CBA). Referring also to FIG. 2B, a "supercorrelation" or correlation sequence 206 of 16,384 ($2^{14}$) symbols may comprise a set of 2, 3, 4, of N segments of equal or near-equal length. For example, some values of N may not be integer divisors of a particular correlation sequence length, and thus larger address spaces may waste a certain number of symbols to ensure N equal segments. For example, given the correlation sequence 206 of 16,384 symbols and N=5, 5 equal segments of 136 symbols each may be achieved (e.g., and 5!=120 unique addresses), resulting in 64 wasted symbols. In some embodiments, the correlator 200 may remedy this inefficiency by breaking down the correlation sequence 206 into a set of N segments of non-equal length (e.g., at least two segments within the set of N segments may not have an equal length). It may be noted that the strength of each unique address may become progressively weaker as the number of segments N increases. However, in embodiments the correlator 200 may incorporate coherent combination and decoding (204) of a unique address 120 with little or no degradation in performance, especially if the wasted bits are reclaimed by using sub-correlator sequences of non-equal length. In embodiments, coherent combining includes the necessary phase reference rotation of the correlation result (e.g., the decoded input sequence 210) to properly align the phases of the sub-correlator blocks 202a-202n based on the order in which they are combined. In embodiments, non-coherent combining of the sub-correlator blocks 202a-202n (e.g., and/or corresponding candidate sequences 210a-210n) may also be allowed. For example, combining the magnitudes of each sub-correlator block 202a-202n is an option if preserving the phase information from the correlator 200 is not relevant to the implementation (this will simplify the approach for some embodiments). In the interest of simplicity, phase adjustment for coherent combining will be assumed in the diagrams and accompanying text, such that these diagrams represent both coherent and non-coherent embodiments.

In embodiments, referring back to FIG. 2A, the correlator 200 may be pre-loaded with the original correlator sequence 206 and may receive (e.g., from a Tx node 102 of the network 100) an input sequence 1210 (e.g., a unique address, a permutation of the correlation sequence, a member of the set of N! possible sets of N segments 212a-212n). Each sub-correlator 202a-202n may process the inbound input sequence 1210, indicating or "ringing up" when its associated segment 212a-212n is received. Accordingly, the output of each sub-correlator 202a-202n may include a candidate sequence 210a-210n (e.g., the input sequence 210 as received and processed by each sub-correlator) and a lag value 214a-214n based on the delay involved in the reception and processing by each Nth sub-correlator 202a-202n of the associated Nth segment 212a-212n.

In embodiments, the decoder 204 may provide correlator output comprising a decoded input sequence 210 (e.g., decoded unique address, based on coherent combination of the N candidate sequences 210a-210n) and correlation metrics 216 based on the lag values 214a-214n received from each sub-correlator. For example, the correlation metrics 216 may provide additional support for the decoded input sequence 210, e.g., provided the associated lag values 214a-214n are consistent with a specific permutation of the original correlation sequence 206, or a particular order in which the associated N segments 202a-202n were transmitted and received by the correlator 200. Further, over the set of N sub-correlators 202a-202n, the total allowable lag may be N (allowing for noise components associated with various candidate sequences 210a-210n). For example, if N=3 (referring also to FIG. 2B), a lag of 1 may represent a delay of 2730 symbols, a lag of 2 may represent a delay of 2*2730=5460 symbols, and so forth.

Referring also to FIGS. 3A through 3C and FIG. 4, the address decoder 204 and sub-correlators 202a-202c (e.g., where N=3) and the overall output of the correlator 200 is shown.

Figure 3A:
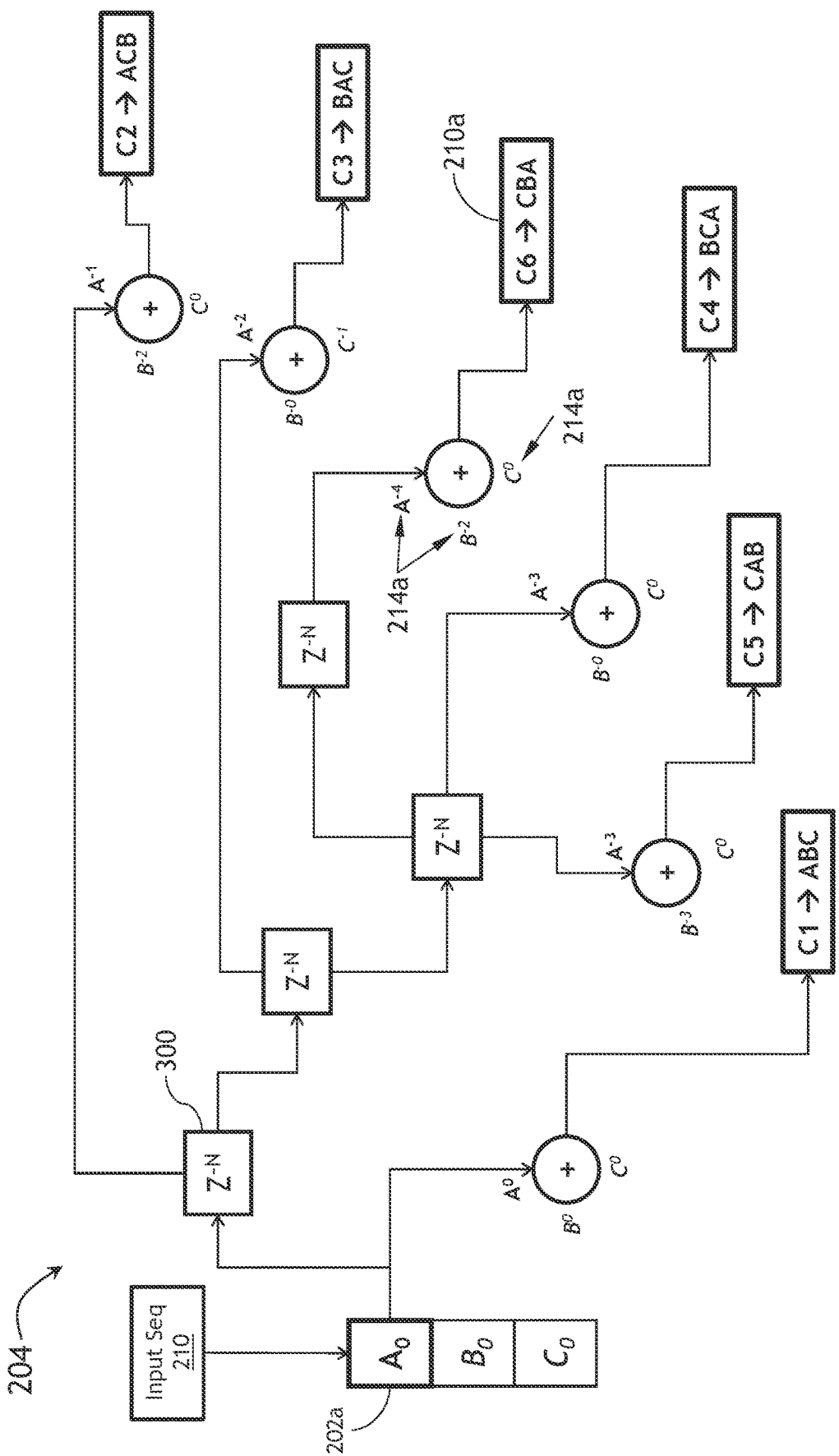
FIGS. 3A through 3C are detailed block diagrams of sub-correlator processing and address decoding operations within the correlator of FIG. 2A.
Figure 3B:
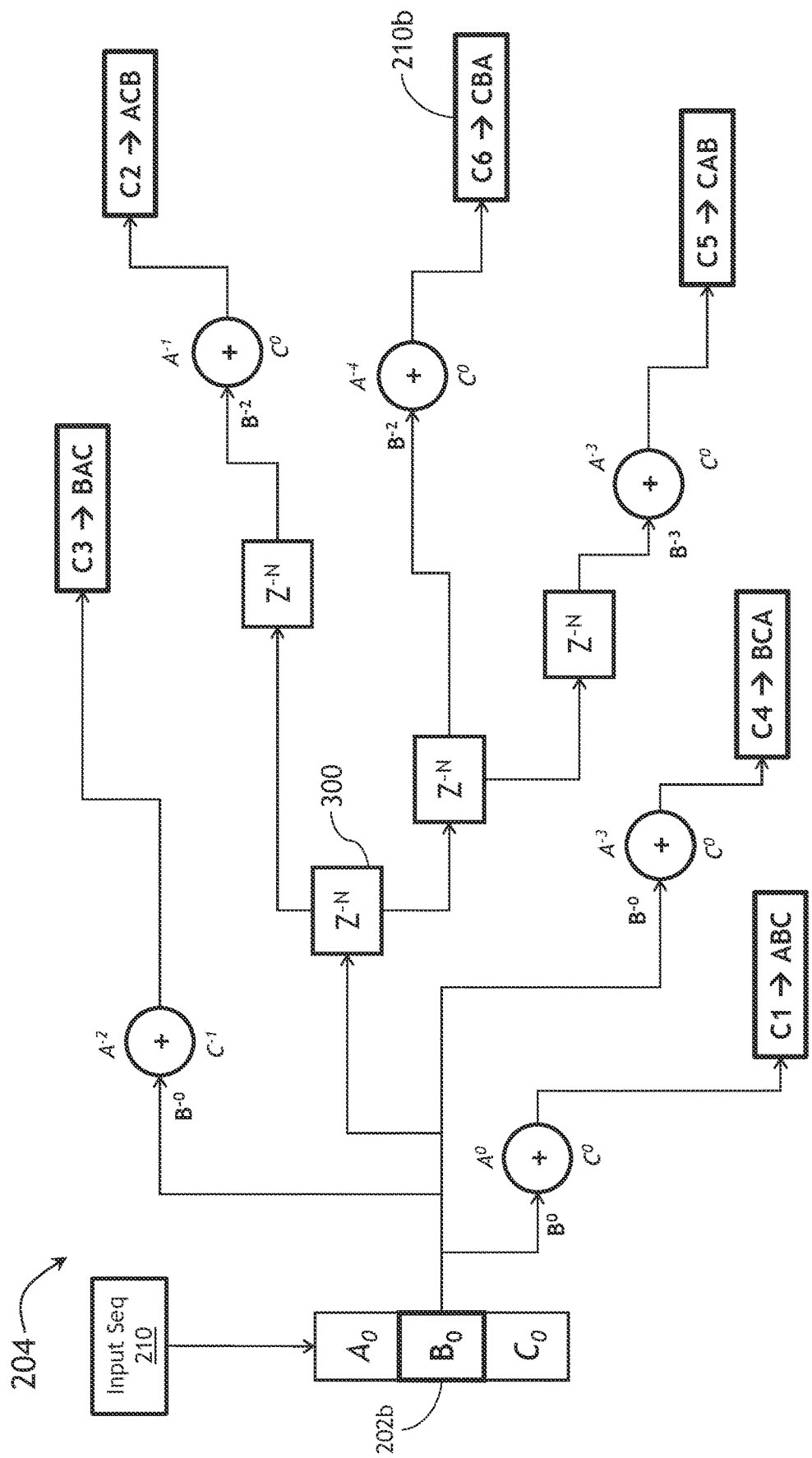
Figure 3C:
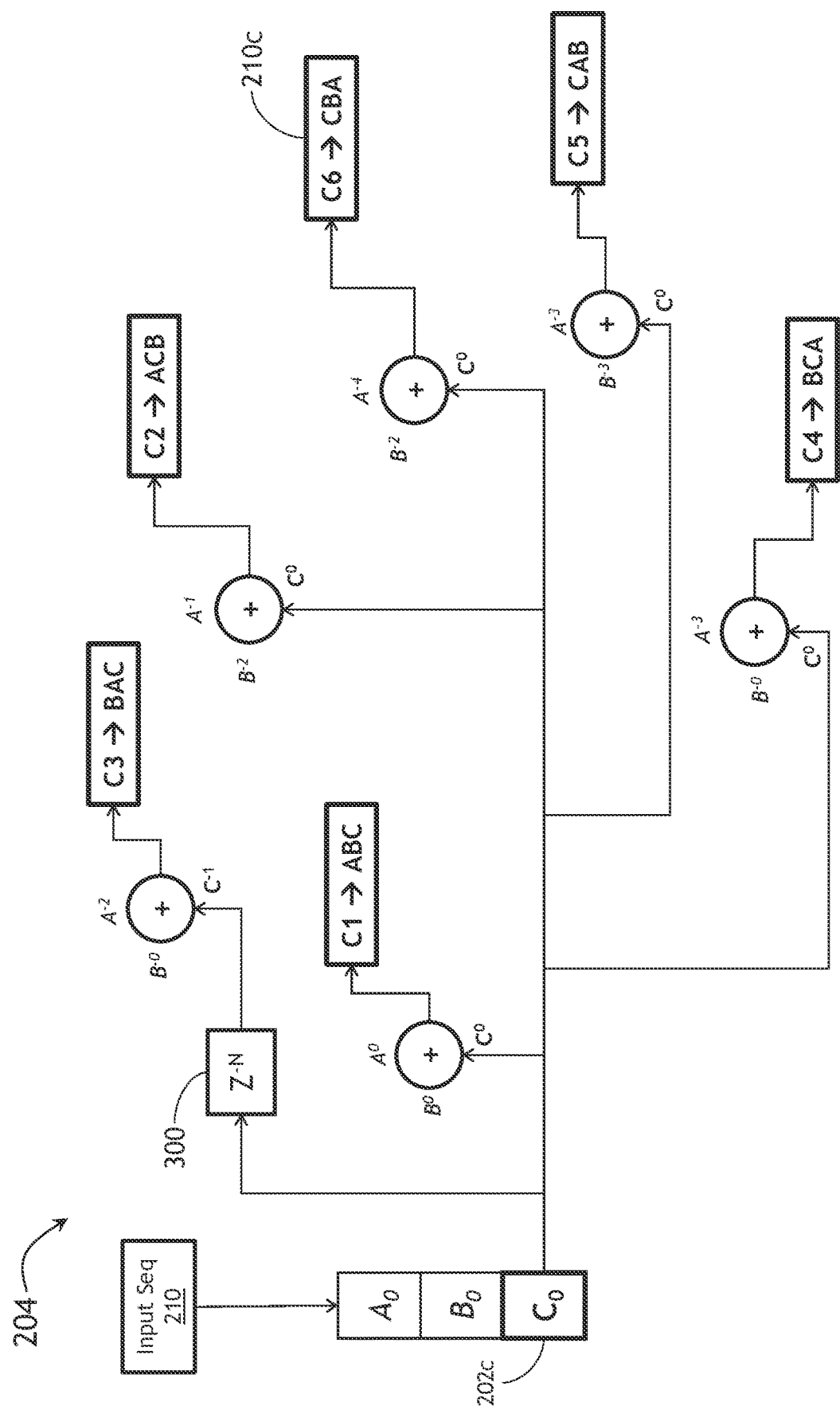

In embodiments, each sub-correlator 202a, 202b, 202c shown by FIGS. 3A through 3C may receive the input sequence 210 (e.g., a permutation of the correlation sequence 206 corresponding to an arrangement of N component segments 212a-212n and to one of N! possible unique addresses). For example, depending on the order in which the N component segments 212a-212n are received and processed by each sub-correlator 202a-202c, lag values 214a-214c may be associated with each component segment. If, for example, N=3 (segments A, B, C), 3!=6 possible input sequences 210 may be received: C1=ABC (corresponding to the original correlation sequence 206); C2=ACB; C3=BAC; C4=BCA; C5=CAB; and C6=CBA.

Figure 4:
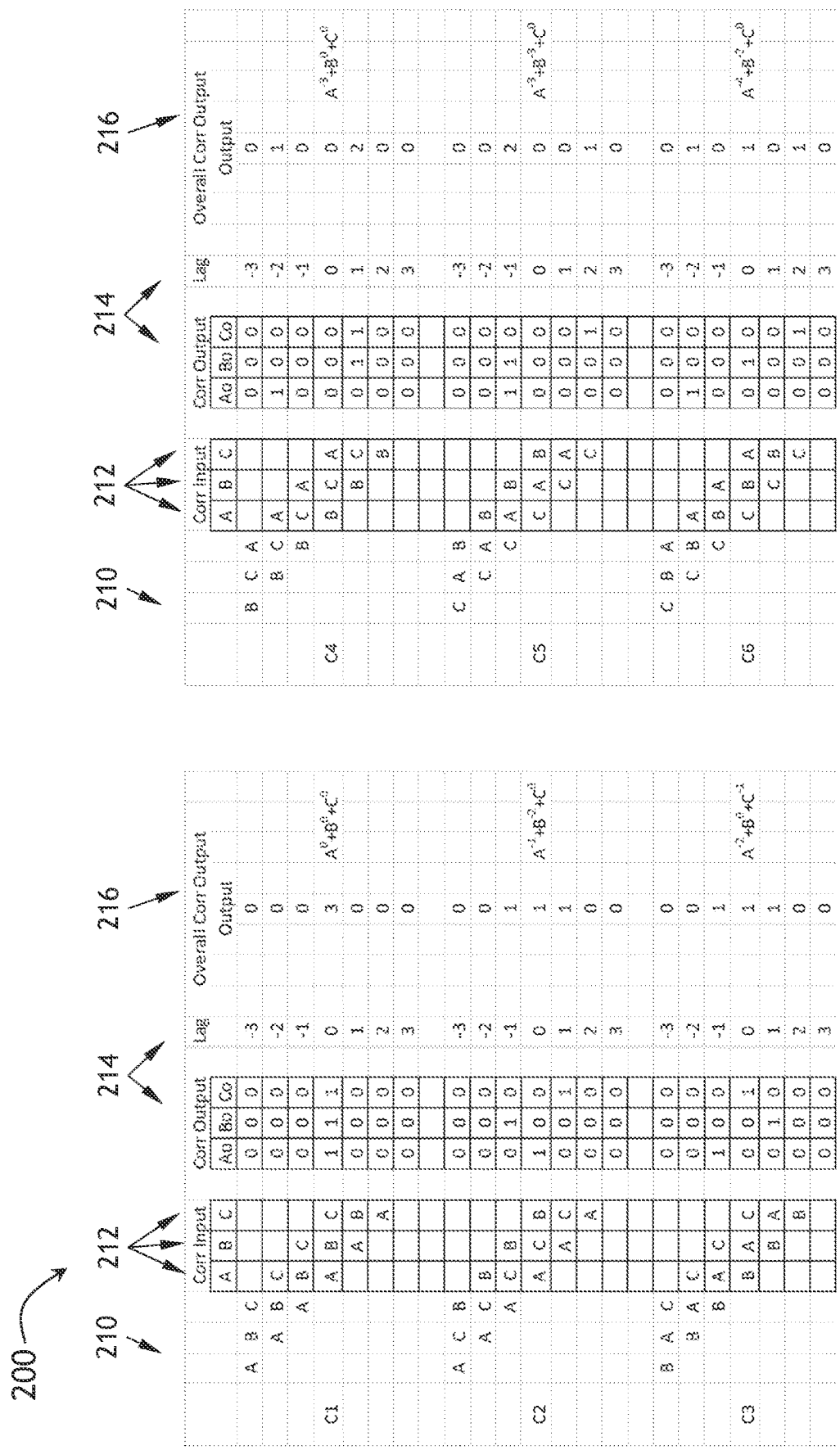
FIG. 4 is a graphical representation of the correlator operations of FIGS. 2A through 3C.

In embodiments, the decoder 204 may delay (300) one or more received segments 212a-212n until all N component segments are received, assigning individual lag values 214 to one or more segments as the input sequence 210 is received, processed, and assembled. For example, the candidate sequence 210a-210c (e.g., C1 through C6) output by each sub-correlator 202a-202c may include lag values 214a-214c for each component segment (e.g., the decoder 204, as shown by FIG. 3A, may receive input sequence C6 (CBA) and receive segment A (212a) only after waiting through the arrival of segment C (212c), which arrives first, and segment B (212b), which arrives second (as shown by FIGS. 3B and 3C). Accordingly, and as shown by FIG. 4, the candidate segment 210a corresponding to input sequence C6 (CBA) may include lag values 214 indicative of a lag value of −2 associated with the segment A (212a), which arrives last, a lag value of 0 associated with the segment B (212b), and a lag value of 2 (+2) associated with the segment C (212c), which arrives first. In embodiments, the correlation metrics 216 associated with the decoded input sequence 210 may interpret these lag values 214 relative to the first-arriving/non-delayed segment C (212c), or: $A^{-4}+B^{-2}+C^{0}$.

Embodiments of the inventive concepts disclosed herein augment spatial awareness provided by Doppler null scanning with the ability to distinguish source nodes from each other. For example, by breaking a correlation sequence into N segments, N! associated input sequences are possible, each sequence uniquely identifying a source node. Accordingly, the multi-node network and its component nodes are protected against spoofing and multipath effects.

FIGS. 5A through 13 and accompanying text below are included as an appendix to provide background on DNS/DNSA and associated correlation techniques, as also disclosed in related applications incorporated herein by reference in their entirety.

Figure 5A:
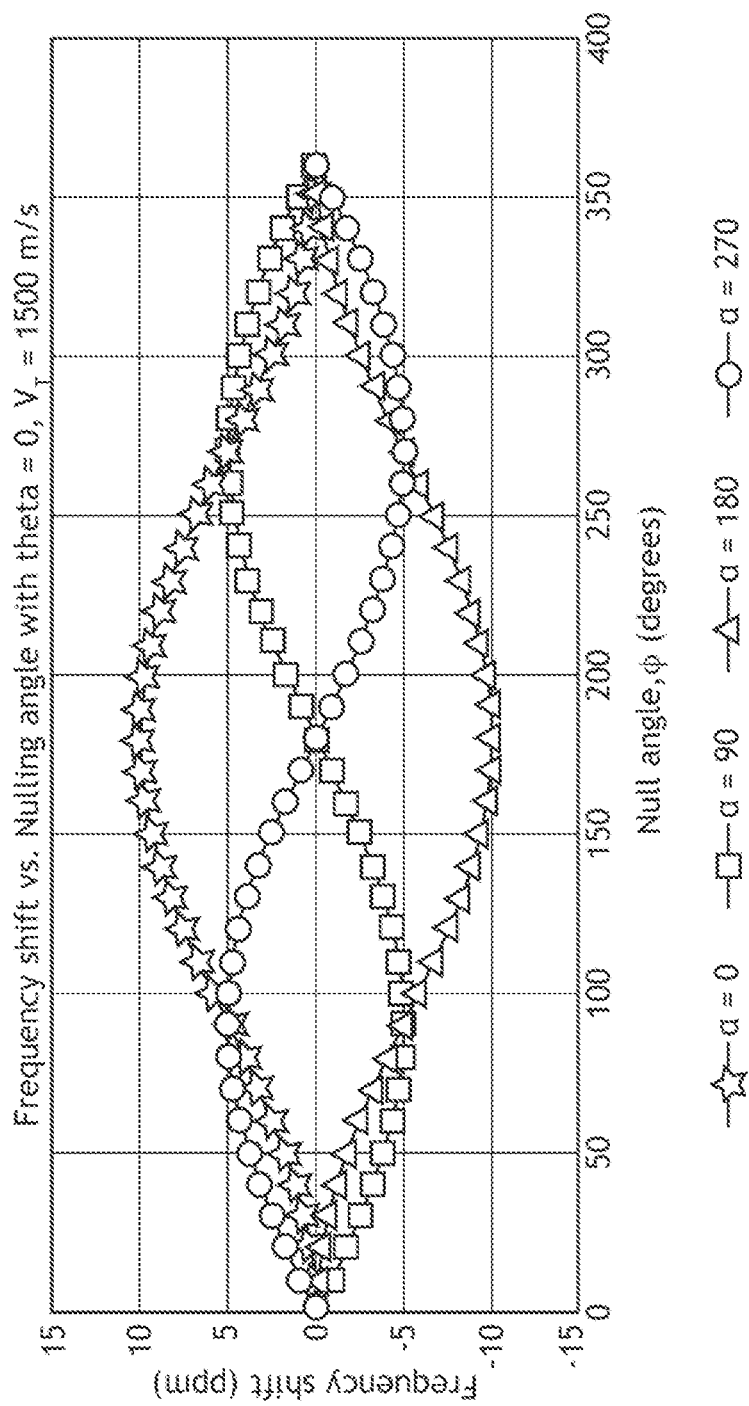
FIG. 5A is a graphical representation of frequency shift profiles within the MANET of FIG. 1.
Figure 5B:
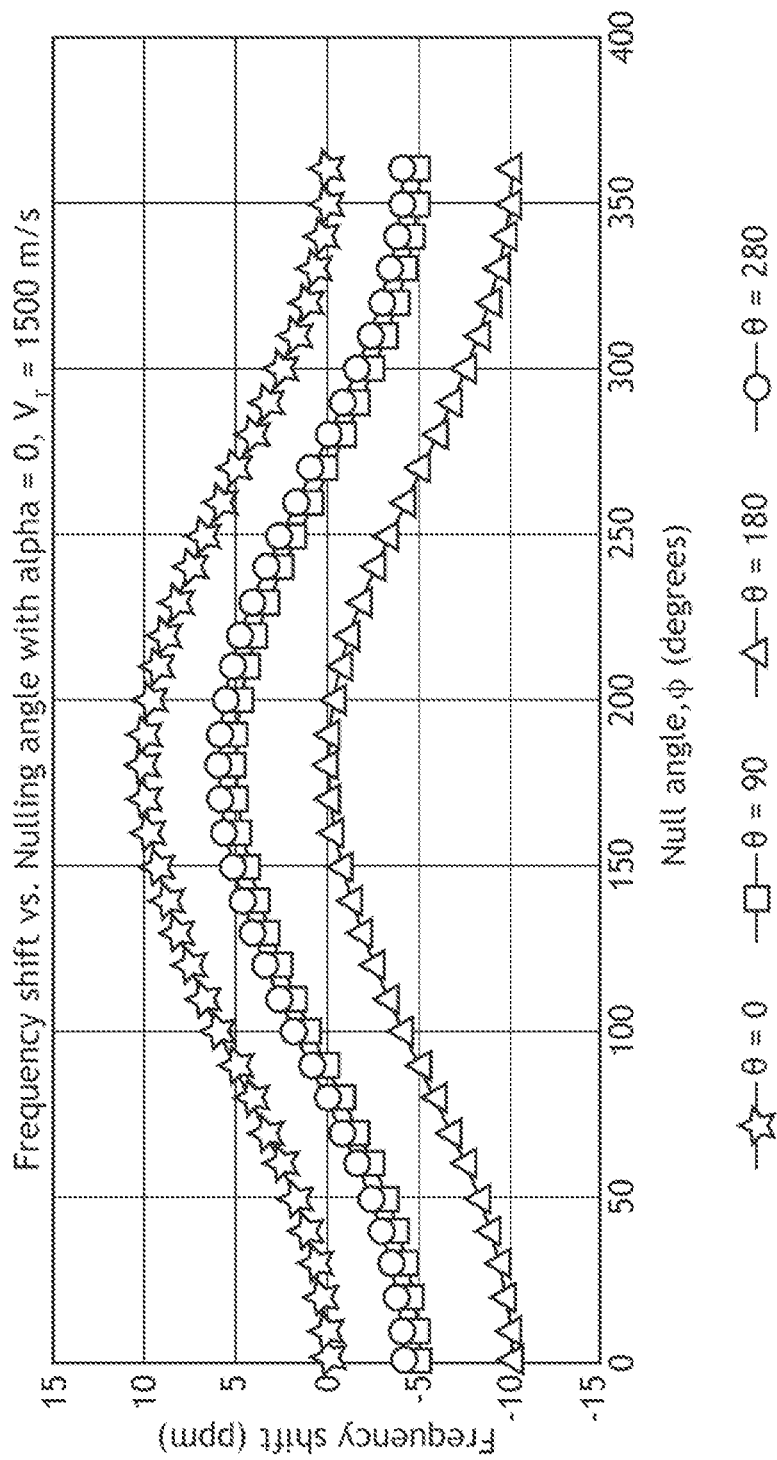
FIG. 5B is a graphical representation of frequency shift profiles within the MANET of FIG. 1.

FIG. 5A shows the resulting net frequency shift as a function of the 'Null' direction $\phi$ (120) for scenarios where a stationary receiver is due east of the transmitter ($\theta$=0), and assuming a transmitter speed $|\vec{V}_T|$ of 1500 meters per second (m/s). FIG. 5B shows the results for a stationary receiver and for several directions with a due-east transmitter node velocity direction ($\alpha$=0). The frequency shifts are in units of parts per million (ppm). As shown in FIGS. 5A and 5B, the amplitude is consistent with the transmitter node's 102 speed of 5 ppm $[|\vec{V}_T|/c*(1\times10^6)]$ regardless of the velocity direction or position, the net frequency shift is zero when the 'Null' angle is in the receiver direction (when $\phi=\theta$), and the minimum occurs when the 'Null' is aligned with the transmitter node's 102 velocity direction (when $\phi=\alpha$).

From the profile, the receiver node 104 can therefore determine the transmitter node's 102 speed, the transmitter node's 102 heading, and the direction of the transmitter node 102 is known to at most, one of two locations (since some profiles have two zero crossings). It should be noted that the two curves cross the y axis twice (0 & 180 degrees in FIG. 5A, and ±90 degrees in FIG. 5B) so there is initially an instance of ambiguity in position direction. In this case the receiver node 104 knows the transmitter node 102 is either East or West of the receiver node 104.

Figure 6:
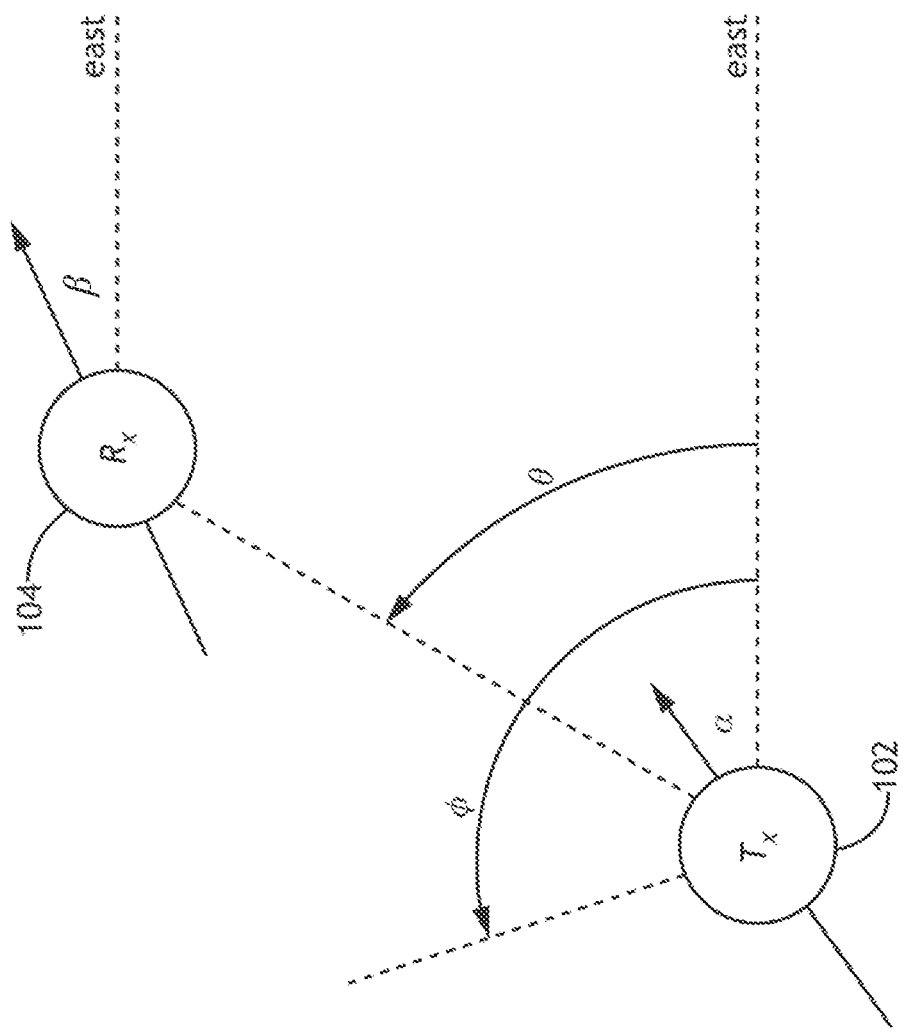
FIG. 6 is a diagrammatic illustration of a transmitter node and a receiver node according to example embodiments of this disclosure.

Referring to FIG. 6, the multi-node network 100 is disclosed. The multi-node network 100 may include multiple communications nodes, e.g., a transmitter (Tx) node 102 and a receiver (Rx) node 104. As shown in FIG. 6 both of the transmitter node 102 and the receiver node 104 are in motion in two dimensions.

The simultaneous movement scenario is depicted in FIG. 6 where the receiver node 104 is also moving in a generic velocity characterized by a speed $|\vec{V}_T|$ and the direction $\beta$ relative to due east. The protocol for the moving receiver node 104 incorporates a frequency adjustment on the receiver node's 104 side to compensate for the receiver node's motion as well. The equations have two additional terms. One is a Doppler term for the motion of the receiver, and the second is frequency compensation by the receiver.

Again, the Doppler shift is a physical phenomenon due to motion and can be considered as a channel effect, but in this case both the transmitter node 102 and the receiver node 104 are moving, so there are two Doppler shift terms. The true Doppler shift as seen by the receiver due to the relative radial velocity is:

$$\frac{\Delta f_{DOPPLER}}{f} = \frac{|\vec{V}_T|}{c}\cos(\theta-\alpha) - \frac{|\vec{V}_R|}{c}\cos(\theta-\beta).$$

The other factors are the transmitter node 102 and receiver node 104 frequency adjustment terms that exactly compensate the Doppler shift when the 'Null' direction aligns with the receiver direction (e.g., when $\phi=\beta$). It is the job of the transmitter node 102 to adjust the transmitter node's 102 transmit frequency according to its own speed ($|\vec{V}_T|$), and velocity direction $\alpha$. That transmitter node frequency adjustment is proportional to the velocity projection onto the 'Null' direction $\phi$ and is the first term in the equation below.

It is the job of the receiver node 104 to adjust the receiver node frequency according to the receiver node's 104 own speed ($|\vec{V}_R|$), and velocity direction $\beta$. That receiver node frequency adjustment is proportional to the velocity projection onto the 'Null' direction $\phi$ and is the second term in the equation below. The receiver node frequency adjustment can be done to the receive signal prior to the frequency resolving algorithm or could be done within the algorithm.

$$\frac{\Delta f_{T\&R}}{f} = -\frac{|\vec{V}_T|}{c}\cos(\varphi-\alpha) + \frac{|\vec{V}_R|}{c}\cos(\varphi-\beta).$$

The net frequency shift seen by the receiver is the sum of all terms:

$$\frac{\Delta f_{net}}{f} = \frac{|\vec{V}_T|}{c}[\cos(\theta-\alpha) - \cos(\varphi-\alpha)] - \frac{|\vec{V}_R|}{c}[\cos(\theta-\beta) - \cos(\varphi-\beta)].$$

Again, it is assumed that the receiver node 104 has an implementation that resolves the frequency of the incoming signal, as would be understood in the art.

Also, it is assumed that the velocity vector and direction changes slowly compared to the periodic measurement of $\Delta f_{net}$. Again, under such conditions, the unknown parameters (from the perspective of the receiver node 104) $\alpha$, $|\vec{V}_T|$, and $\theta$ are constants. When the velocity vector or direction changes faster, this change could be tracked, for example if the change is due to slow changes in acceleration.

Figure 7A:
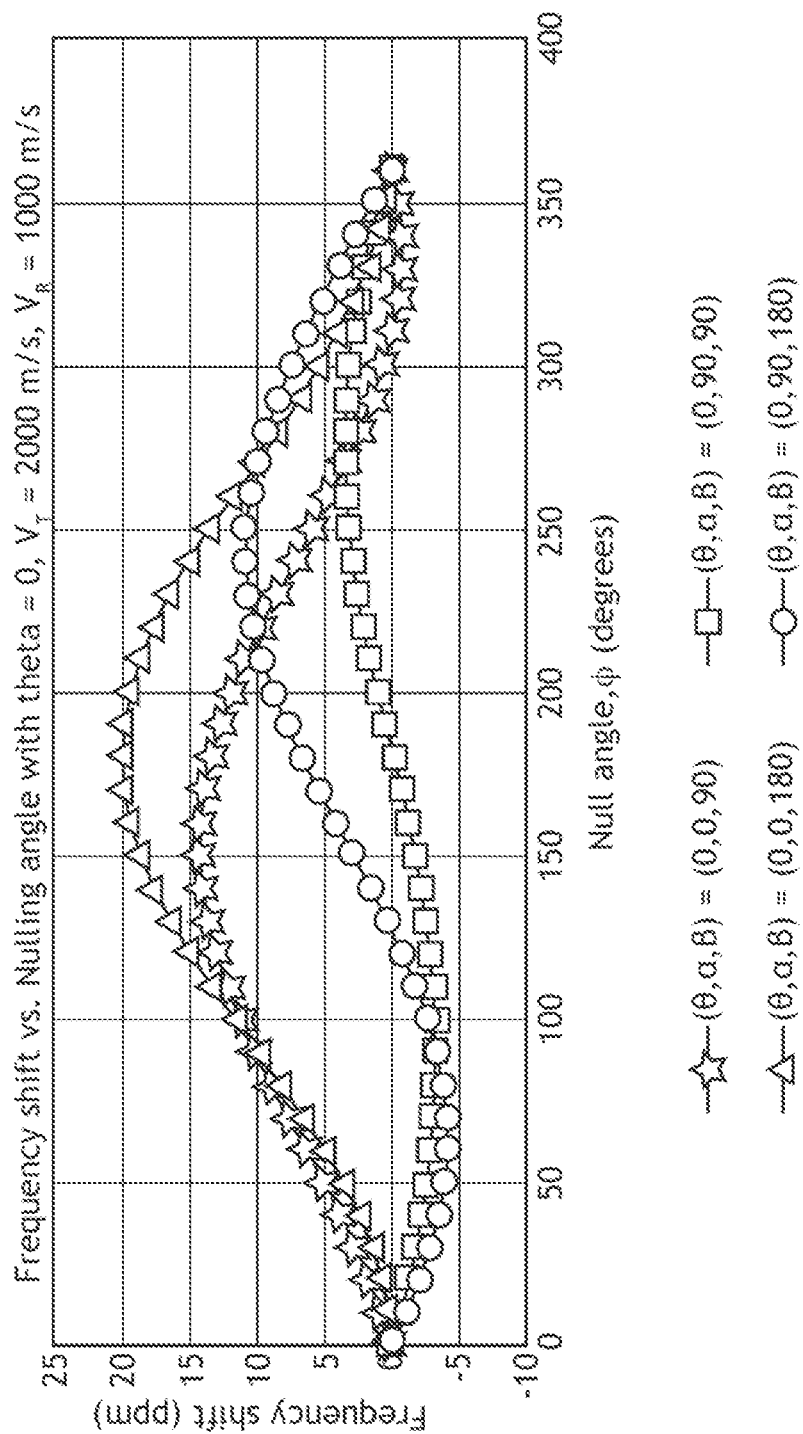
FIG. 7A is a graphical representation of frequency shift profiles within the MANET of FIG. 6.
Figure 7B:
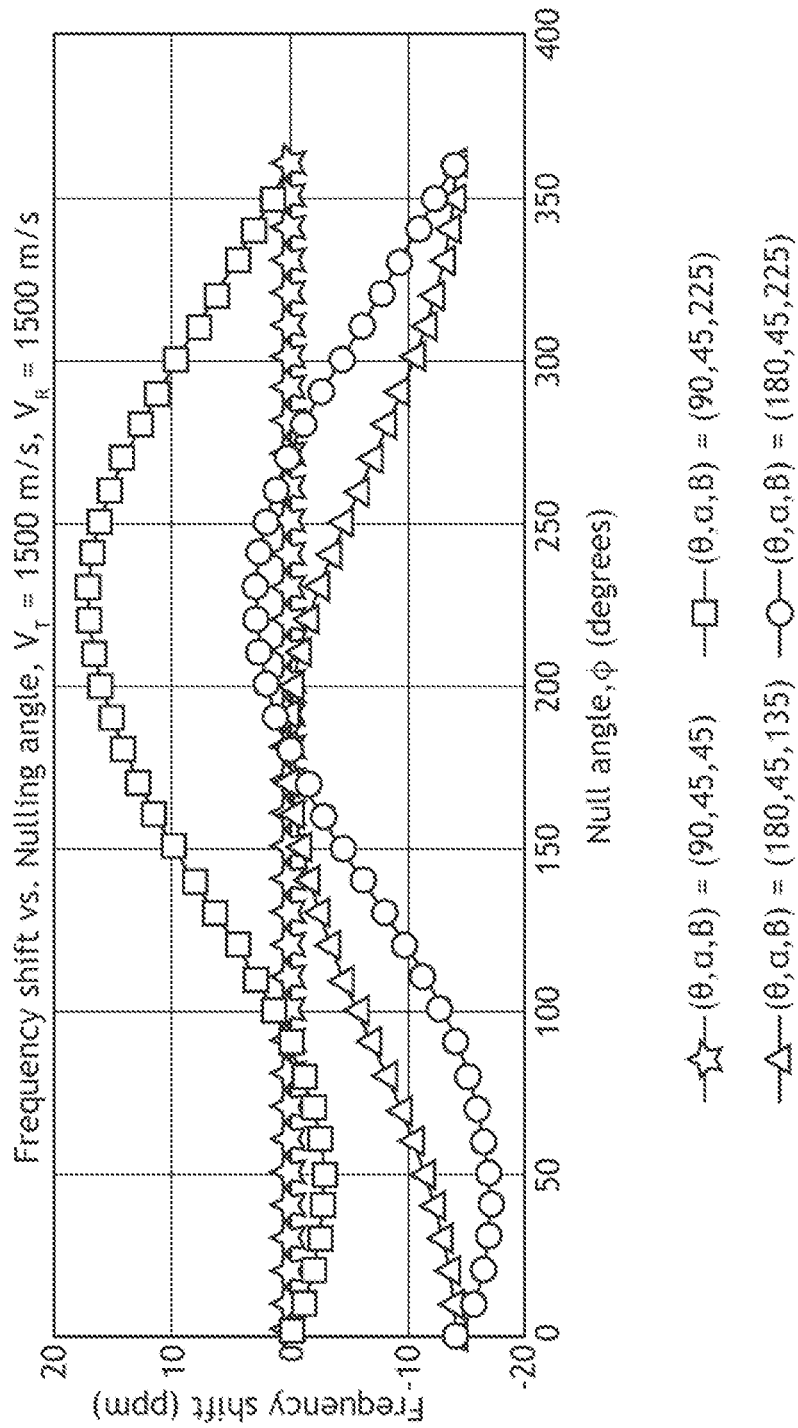
FIG. 7B is a graphical representation of frequency shift profiles within the MANET of FIG. 6.

The net frequency shift for the two-dimensional (2D) moving receiver node 104 approach is shown in FIGS. 7A and 7B for several scenario cases of receiver node location $\theta$, transmitter node and receiver node speeds ($|\vec{V}_T|$ & $|\vec{V}_R|$), and transmitter node and receiver node velocity directions $\alpha$ and $\beta$ respectively. FIG. 7A shows different speeds for the transmitter node 102 and receiver node 104 as well as the receiver node location of $\theta=0$. FIG. 7B assumes the same speed (e.g., 1500 m/s) for the transmitter node and receiver node. Similarly, there are three concepts to notice here:

First, the amplitude is consistent with the relative velocity between transmitter node 102 and receiver node 104.

$$\frac{\left|\left(|\vec{V_T}|\cos\alpha - |\vec{V_R}|\cos\beta\right)\right|}{c*1e^6}.$$

Second, the net frequency shift is zero when the 'Null' angle is in the receiver direction, e.g., when $\phi=\theta$.

Third, the minimum occurs when the 'Null' angle is aligned with the relative velocity direction, e.g., when $\phi=$angle $(|\vec{V_T}|\cos\alpha - |\vec{V_R}|\cos\beta)$.

Again, there is an initial dual point ambiguity with the position $\theta$, but the transmitter node's 102 speed and velocity vector are known.

Figure 8:
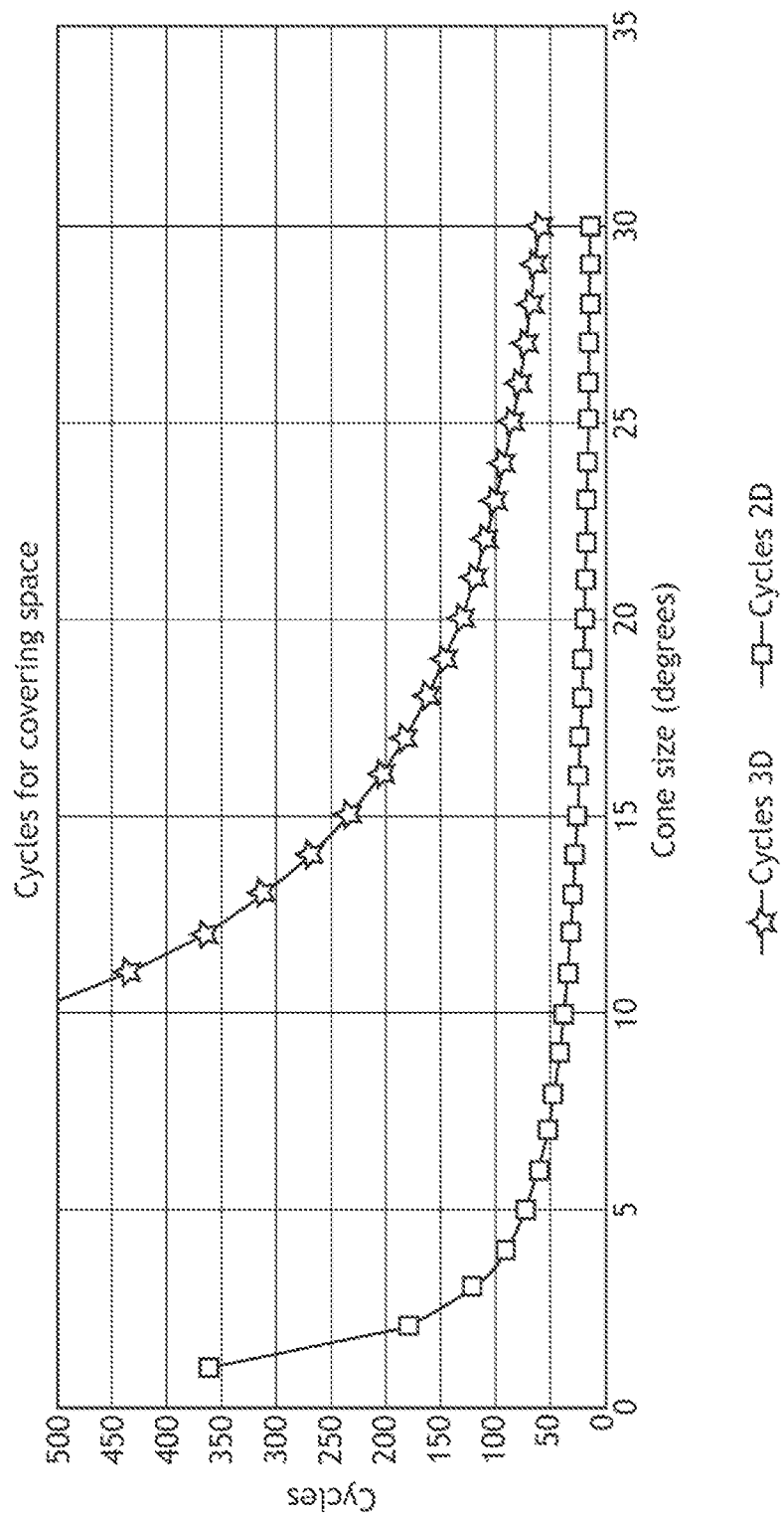
FIG. 8 is a graph of sets for covering space.

Referring now to FIG. 8, while the 2D picture is easier to visualize, the same principles apply to the 3D case. FIG. 8 shows a number of direction sets needed to span 3D and 2D space with different cone sizes (cone sizes are full width). Before diving into the equations, it's worth commenting on the size of the space when including another dimension. For example, when a 'Null' step size of 10 degrees was used in the previous examples, it took 36 sets to span the 360 degrees in 2D. Thus, if an exemplary detection angle of 10 degrees is used (e.g., a directional antenna with 10-degree cone) it would take 36 sets to cover the 2D space. The 3D fractional coverage can be computed by calculating the coverage of a cone compared to the full $4\pi$ pi steradians. The fraction is equal to the integral $$FractionCoverage3D = \int_0^{\frac{ConeSize}{2}} \frac{r^2\sin(\theta')d\theta'd\varphi}{4\pi r^2} = \frac{1-\cos\left(\frac{ConeSize}{2}\right)}{2}$$

$$FractionCoverage2D = \frac{2\pi}{ConeSize}$$

The number of sets to span the space is shown in FIG. 8 for both the 2D and 3D cases, which correlates with discovery time. Except for narrow cone sizes, the number of sets is not drastically greater for the 3D case (e.g., approximately 15 times at 10 degrees, 7 time at 20 degrees, and around 5 times at 30 degrees). Unless systems are limited to very narrow cone sizes, the discovery time for 3D searches is not overwhelming compared to a 2D search.

Figure 9:
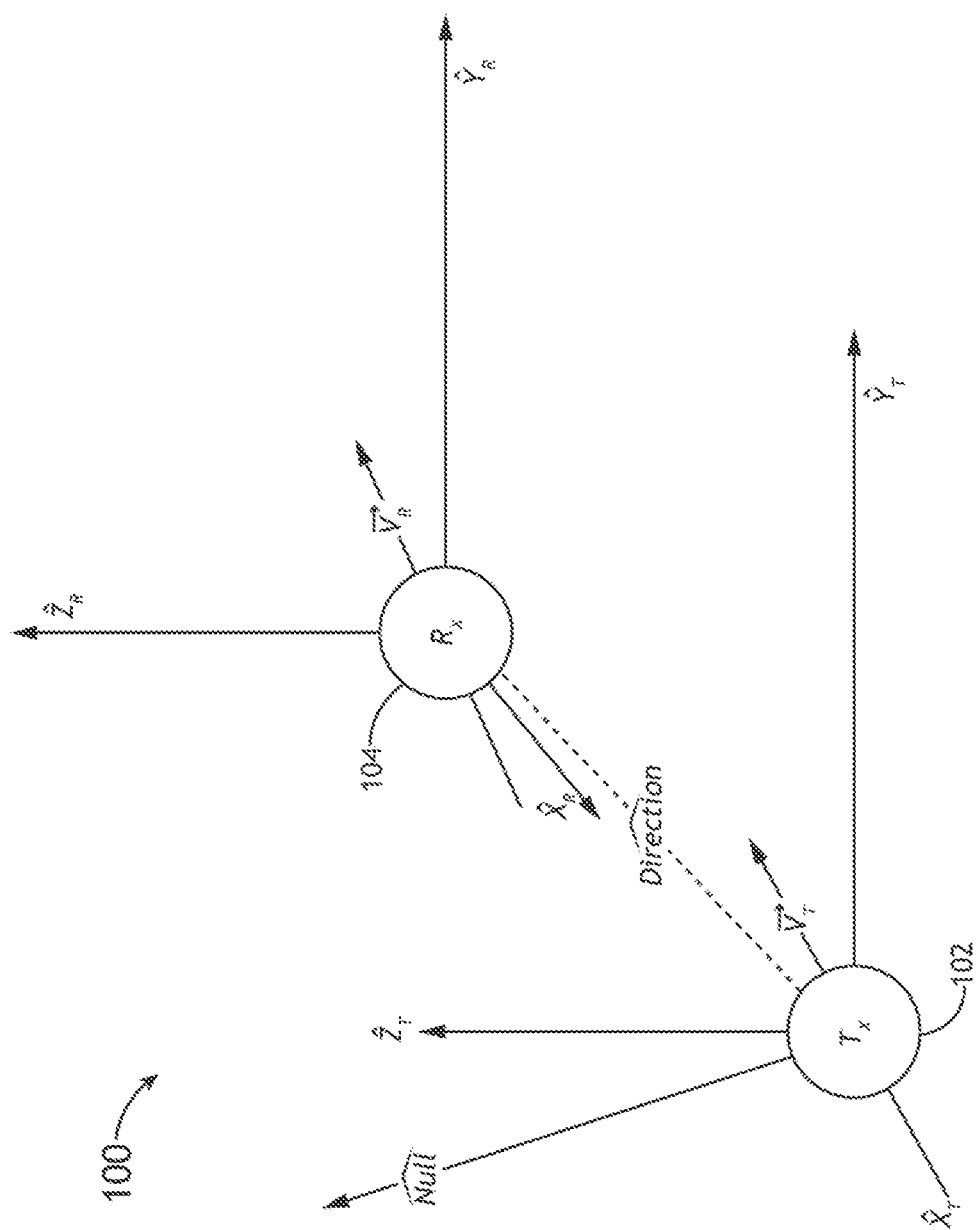
FIG. 9 is a diagrammatic illustration of a transmitter node and a receiver node according to example embodiments of this disclosure.

Referring now to FIG. 9, the multi-node network 100 is disclosed. The multi-node network 100 may include multiple communications nodes, e.g., a transmitter (Tx) node 102 and a receiver (Rx) node 104. As shown in FIG. 9 both of the transmitter node 102 and the receiver node 104 are in motion in three dimensions.

The 3D approach to Doppler nulling follows the 2D approach but it is illustrated here with angles and computed vectorially for simplicity.

In three dimensions, it is convenient to express the equations in vector form which is valid for 2 or 3 dimensions. FIG. 9 shows the geometry in 3 dimensions where $\widehat{Direction}$ is the unit vector pointing to the receiver from the transmitter, and $\widehat{Null}$ is the unit vector pointing in the 'Null' direction defined by the protocol.

The true Doppler shift as seen by the receiver node 104 due to the relative radial velocity which is the projection onto the $\widehat{Direction}$ vector:

$$\frac{\Delta f_{DOPPLER}}{f} = \frac{1}{c}\vec{V_T}\cdot\widehat{Direction} - \frac{1}{c}\vec{V_R}\cdot\widehat{Direction}.$$

The nulling protocol adjusts the transmit node frequency and receiver node frequency due to their velocity projections onto the Null direction $$\frac{\Delta f_T}{f} = -\frac{1}{c}\vec{V_T}\cdot\widehat{Null} + \frac{1}{c}\vec{V_R}\cdot\widehat{Null}.$$

The net frequency shift seen by the receiver node 104 is the sum of all terms:

$$\frac{\Delta f_{net}}{f} = \frac{1}{c}\vec{V_T}\cdot\widehat{Direction} - \frac{1}{c}\vec{V_R}\cdot\widehat{Direction} - \frac{1}{c}\vec{V_T}\cdot\widehat{Null} + \frac{1}{c}\vec{V_R}\cdot\widehat{Null}.$$

The net frequency shift for the 3D moving receiver node 104 approach is not easy to show pictorially but can be inspected with mathematical equations to arrive at useful conclusions. The first two terms are the Doppler correction (DC) offset and the last two terms are the null dependent terms. Since the $\widehat{Null}$ is the independent variable, the maximum occurs when $(\vec{V_R}-\vec{V_T})$ and $\widehat{Null}$ are parallel and is a minimum when they are antiparallel. Furthermore, the relative speed is determined by the amplitude $$Amplitude = \frac{|\vec{V_R}-\vec{V_T}|}{c}.$$

Lastly, the net frequency is zero when the $\widehat{Null}$ is parallel (i.e., parallel in same direction, as opposed to anti-parallel) to $\widehat{Direction}$:

$$\frac{\Delta f_{net}}{f} =$$

$$0 \text{ when } \frac{1}{c}\vec{V_T}\cdot\widehat{Direction} - \frac{1}{c}\vec{V_R}\cdot\widehat{Direction} = \frac{1}{c}\vec{V_T}\cdot\widehat{Null} - \frac{1}{c}\vec{V_R}\cdot\widehat{Null}$$

or $$(\vec{V_T}-\vec{V_R})\cdot\widehat{Direction} = (\vec{V_T}-\vec{V_R})\cdot\widehat{Null}.$$

For the 3D case:

The amplitude is consistent with the relative velocity between transmitter node 102 and receiver node 104

$$\left[\frac{|\vec{V_R}-\vec{V_T}|}{c}\right].$$

The net frequency shift is zero when the 'Null' angle is in the receiver node direction, e.g., $(\vec{V_T}-\vec{V_R})\cdot\widehat{Direction} = (\vec{V_T}-\vec{V_R})\cdot\widehat{Null}$.

The minimum occurs when the 'Null' is aligned with the relative velocity direction.

Referring still to FIG. 9, in some embodiments, the system (e.g., the multi-node network 100) may include a transmitter node 102 and a receiver node 104. Each node of the transmitter node 102 and the receiver node 104 may include a communications interface 110 including at least one antenna element 112 and a controller operatively coupled to the communications interface, the controller 106 including one or more processors, wherein the controller 106 has information of own node velocity and own node orientation. The transmitter node 102 and the receiver node 104 may be in motion (e.g., in two dimensions or in three dimensions). The transmitter node 102 and the receiver node 104 may be time synchronized to apply Doppler corrections associated with said node's own motions relative to a common reference frame (e.g., a common inertial reference frame (e.g., a common inertial reference frame in motion or a stationary common inertial reference frame)). The common reference frame may be known to the transmitter node 102 and the receiver node 104 prior to the transmitter node 102 transmitting signals to the receiver node 104 and prior to the receiver node 104 receiving the signals from the transmitter node 102. In some embodiments, the system is a mobile ad-hoc network (MANET) comprising the transmitter node 102 and the receiver node 104.

In some embodiments, the applying of the Doppler corrections associated with the receiver node's own motions relative to the common reference frame is based on a common reference frequency. For example, a common reference frequency may be adjusted by a node's own motions to cancel out those motions in reference to the null angle. This common reference frequency may be known by each node prior to transmission and/or reception of the signals. In some embodiments, calculating the net frequency change seen by the receiver node 104 is based on the common reference frequency. For example, the net frequency change may be a difference between a measured frequency of the signals and the common reference frequency.

For purposes of discussing the receiver node 104, a "source" generally refers to a source of a received signal, multiple sources of multiple signals, a single source of multiple signals, and/or the like. For example, a source may be a transmitter node 102 configured to apply Doppler corrections as disclosed herein and in applications from which priority is claimed and/or incorporated by reference. In this regard, a receiver node 104 may determine one or more attributes of the source (e.g., bearing between the receiver node 104 and the source, bearing of the velocity of the source, amplitude/speed of the velocity, range, and the like). In some embodiments, the receiver node 104 and the source (e.g., transmitter node 102) are configured to use a same, compatible, and/or similar Doppler correction, protocol, common reference frame, common reference frequency, time synchronization, and/or the like such that the receiver node 104 may determine various attributes of the source. Note, in some embodiments, that one or more of these may be known ahead of time, be determined thereafter, included as fixed variable values as part of the protocol, and/or determined dynamically (in real time) as part of the protocol. For example, the protocol may determine that certain common reference frames should be used in certain environments, such as using GPS coordinates on land and a naval ship beacon transmitter common reference frame location (which may be mobile) over certain areas of ocean, which may dynamically change in real time as a location of a node changes.

In some embodiments, the transmitter node 102 and the receiver node 104 are time synchronized via synchronization bits associated with acquisition. For example, the synchronization bits may operate as physical layer overhead.

In some embodiments, the transmitter node 102 is configured to adjust a transmit frequency according to an own speed and an own velocity direction of the transmitter node 102 so as to perform a transmitter-side Doppler correction. In some embodiments, the receiver node 104 is configured to adjust a receiver frequency of the receiver node 104 according to an own speed and an own velocity direction of the receiver node 104 so as to perform a receiver-side Doppler correction. In some embodiments, an amount of adjustment of the adjusted transmit frequency is proportional to a transmitter node 102 velocity projection onto a Doppler null direction, wherein an amount of adjustment of the adjusted receiver frequency is proportional to a receiver node 104 velocity projection onto the Doppler null direction. In some embodiments, the receiver node 102 is configured to determine a relative speed between the transmitter node 102 and the receiver node 104. In some embodiments, the receiver node 104 is configured to determine a direction that the transmitter node 102 is in motion and a velocity vector of the transmitter node 102. In some embodiments, a maximum net frequency shift for a Doppler correction by the receiver node 104 occurs when a resultant vector is parallel to the Doppler null direction, wherein the resultant vector is equal to a velocity vector of the receiver node 104 minus the velocity vector of the transmitter node 102. In some embodiments, a minimum net frequency shift for a Doppler correction by the receiver node 104 occurs when a resultant vector is antiparallel to the Doppler null direction, wherein the resultant vector is equal to a velocity vector of the receiver node 104 minus the velocity vector of the transmitter node 102. In some embodiments, a net frequency shift for a Doppler correction by the receiver node 104 is zero when a vector pointing to the receiver node from the transmitter node 102 is parallel to the Doppler null direction.

Figure 10:
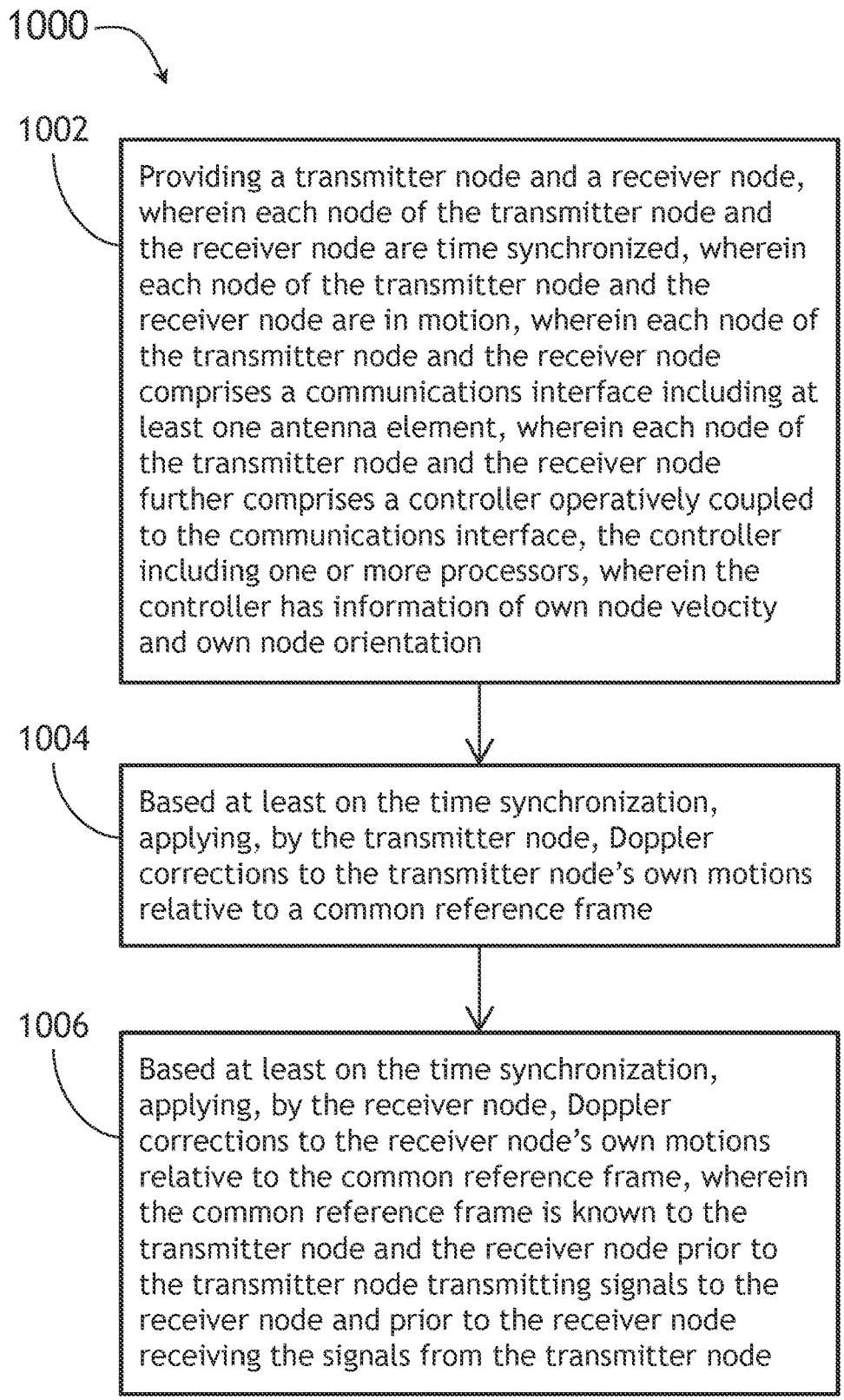
FIG. 10 is a flow diagram illustrating a method according to example embodiments of this disclosure.

Referring now to FIG. 10, an exemplary embodiment of a method 1000 according to the inventive concepts disclosed herein may include one or more of the following steps. Additionally, for example, some embodiments may include performing one or more instances of the method 1000 iteratively, concurrently, and/or sequentially. Additionally, for example, at least some of the steps of the method 1000 may be performed in parallel and/or concurrently. Additionally, in some embodiments, at least some of the steps of the method 1000 may be performed non-sequentially.

A step 1002 may include providing a transmitter node and a receiver node, wherein each node of the transmitter node and the receiver node are time synchronized, wherein each node of the transmitter node and the receiver node are in motion, wherein each node of the transmitter node and the receiver node comprises a communications interface including at least one antenna element, wherein each node of the transmitter node and the receiver node further comprises a controller operatively coupled to the communications interface, the controller including one or more processors, wherein the controller has information of own node velocity and own node orientation.

A step 1004 may include based at least on the time synchronization, applying, by the transmitter node, Doppler corrections to the transmitter node's own motions relative to a common reference frame.

A step 1006 may include based at least on the time synchronization, applying, by the receiver node, Doppler corrections to the receiver node's own motions relative to the common reference frame, wherein the common reference frame is known to the transmitter node and the receiver node prior to the transmitter node transmitting signals to the receiver node and prior to the receiver node receiving the signals from the transmitter node.

Further, the method 1000 may include any of the operations disclosed throughout.

The null scanning technique discussed herein illustrates a system and a method for spatial awareness from resolving the temporal spatial characteristics of the transmitter node's 102 radiation. This approach informs the receiver node 104 of the relative speed between the transmitter node 102 and receiver node 104 as well as the transmitter node direction and transmitter node velocity vector. This approach includes scanning through all directions and has a high sensitivity (e.g., low net frequency shift) when the null direction is aligned with the transmitter node direction. This approach can be implemented on a highly sensitive acquisition frame which is typically much more sensitive than explicit data transfers which allow for the ultra-sensitive spatial awareness with relatively low power.

This sentence may mark an end to the (at least partially) reproduced language from U.S. patent application Ser. No. 17/857,920 corresponding to the (at least partially) reproduced FIGS. 1 and 5A-10. However, note that this paragraph is nonlimiting, and changes may have been made and language added or removed, and not all the language above or corresponding figures above are necessarily reproduced from U.S. patent application Ser. No. 17/857,920.

Figure 11:
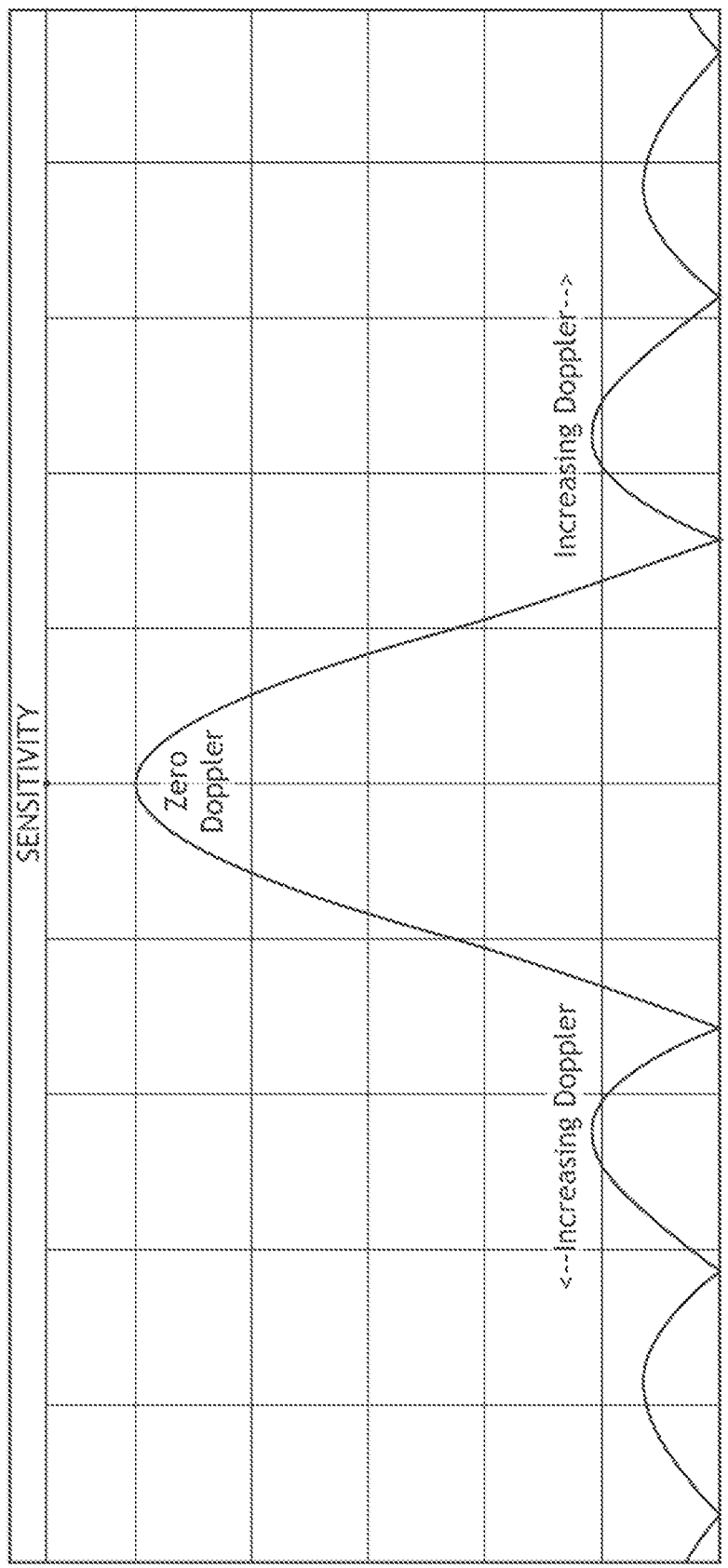
FIG. 11 is an exemplary graph of sensitivity versus Doppler effect magnitude.
Figure 12:
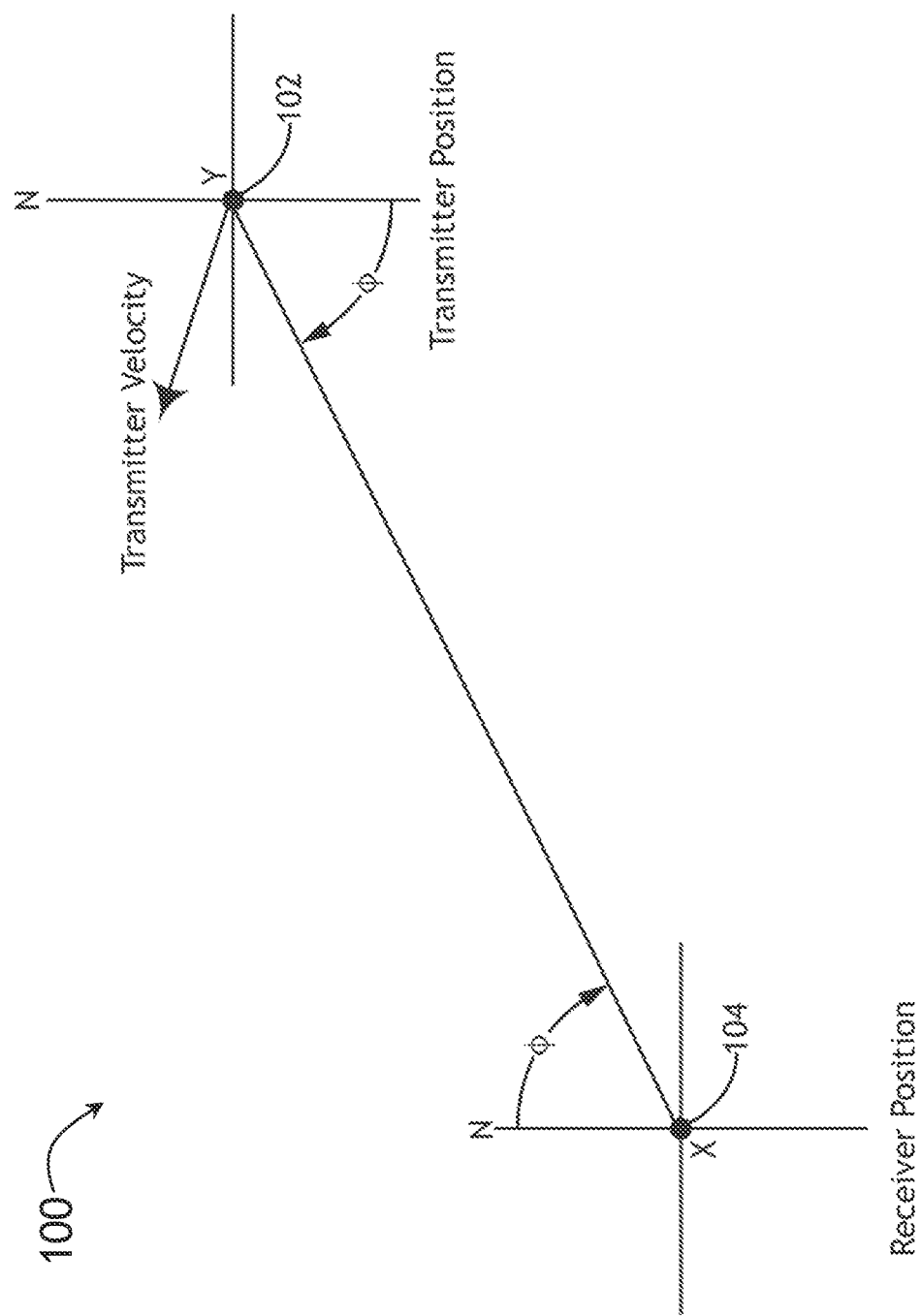
FIG. 12 is a diagrammatic illustration of a transmitter node and a receiver node according to example embodiments of this disclosure.
Figure 13:
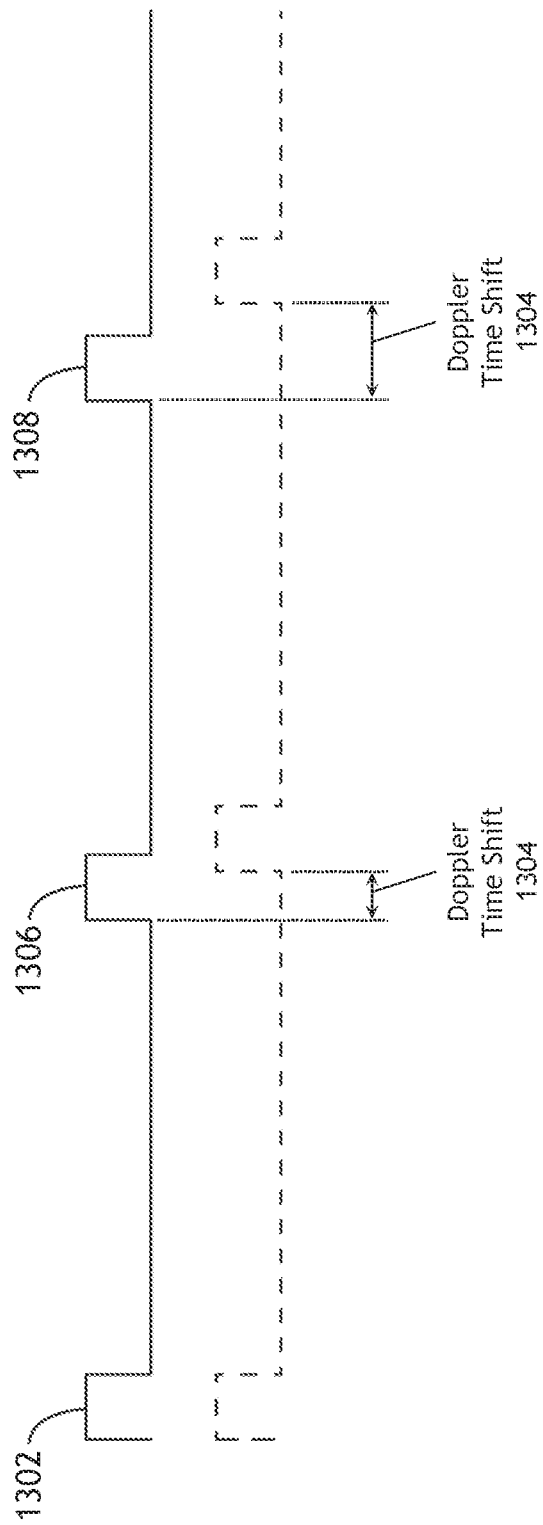
FIG. 13 is an illustration of sequential pulses showing the slipping of chip timing between pulses according to example embodiments of this disclosure.

FIGS. 11 through 13 are directed to application of Doppler corrections by time-synchronized transmitter (Tx) and receiver (Rx) nodes as also disclosed in related application Ser. No. 17/534,061, which application is herein incorporated by reference in its entirety.

Referring now to FIG. 11, detection sensitivity for weak radio signals is often limited by the Doppler effect which incidentally adds frequency shifts to the signal due to motion. Doppler shift can result either from transmitter motion and/or receiver motion, often both. Sensitivity caused by Doppler modulation can be characterized mathematically from the sine cardinal (sinc) squared function $$\left(\text{i.e., } \frac{\sin^2 x}{x}\right).$$

Receiver sensitivity is progressively reduced as Doppler magnitude increases, as shown in FIG. 11. Typically, Doppler effects become most noticeable when relative motion is large and channel frequencies are high.

For current modern radio systems, the problem becomes progressively acute with increasing channel frequencies and directional antennas. With increasing channel frequencies comes correspondingly increased Doppler. Because directional systems must allot time for discovery in multiple directions, any increase in acquisition time caused by Doppler shift increases overall discovery time, with accompanying system performance degradations.

Signal acquisition and detection sensitivity in current modern digital communications systems are most often contingent on a digital correlation sequence. Usable length for such a correlation sequence (and consequent resulting sensitivity) may be limited by Doppler shift as phase rotation increases across the correlator length resulting in the aforementioned sinc function correlation amplitude variation relative to Doppler frequency offset. With increasing signal frequency offsets, optimal correlator length decreases, and a system designer should choose a correlator length suitable to the Doppler requirements. Multiple short length correlation sequences are subsequently often used to allow sensitivity improvement beyond that of a single short correlation sequence but such an approach exhibits degraded sensitivity compared to a single long sequence of the same total length. In the presence of large Doppler shift, even a combination of multiple short sequences may be problematic. While multiple short sequences may be better than nothing, for the same number of bits the approach does not deliver the same sensitivity attainable with coherent detection of a single long sequence without Doppler.

In summary, currently, a short correlation sequence is relatively unaffected by Doppler but has the drawback of yielding low sensitivity, whereas a long correlation sequence may be capable of yielding high sensitivity but only when Doppler is minimal.

Referring now to FIG. 12, an exemplary embodiment of a system (e.g., the multi-node network 100) according to the inventive concepts disclosed herein is depicted. The system (e.g., the multi-node network 100) may include a transmitter node 102 and a receiver node 104.

The transmitter node 102 and the receiver node 104 can be time synchronized to apply Doppler correction respectively for their own motions relative to a common inertial reference frame. As a transmit angle advances, a receive angle retreats by a same amount as the transmit angle advance. This can be understood by first considering a transmitter node 102 when the transmitter node 102 applies full Doppler correction in the transmitter node's 102 direction of travel. Next, consider a receiver node 104 directly in line with the path of travel for the transmitter node 102. If the receiver node 104 at the same time similarly applies Doppler correction for the receiver node's 104 motion in line with the transmitter node 102, then at least a near-zero Doppler path (e.g., a near-zero Doppler path or a zero Doppler path) will exist from the transmitter node 102 to the receiver node 104. As shown in FIG. 12, this concept is shown with an arbitrary angle $\phi$ when both the receiver node 104 and the transmitter node 102 utilize the same reference frame.

When both the receiver node 104 and the transmitter node apply such synchronized Doppler correction relative to the common inertial reference frame, then the Doppler correction can be swept through a plurality of (e.g., some or all) angles so that a zero Doppler path or near-zero Doppler path will exist from the transmitter node 102 to the receiver node 104 including the angle resulting in the near-zero Doppler path or the zero Doppler path. A zero Doppler path has zero net frequency offset. For example, an angle resulting in the near-zero Doppler path may be an angle that is within 5 degrees of the angle resulting in the zero Doppler path. For any combination of the transmitter 102 and the receiver node 104 motions and locations, there exists a zero-Doppler path when the Doppler correction angle is equal to the direction angle $\phi$. Hence, a zero-Doppler path will be available between the transmitter node 102 and the receiver node 104 when the two are synchronized to apply Doppler correction for a swept angle $\phi$, relative to the inertial reference, as illustrated in FIG. 12. Neither the transmitter node 102 nor the receiver node 104 need to know a direction to the other node in advance.

Although FIG. 12 is shown for a two-dimensional reference frame, as this suffices for many line-of-sight scenarios (e.g., long-distance air-to-air communications), extension to three-dimensions is straightforward (e.g., to support satellite communications). As an example, in a three-dimensional reference frame when the transmitter points up and North, the receiver points down and South. Three-dimensional scan time may be somewhat longer than two-dimensional scan time but remains well bounded for many scenarios.

With zero Doppler, a long correlation sequence, or even multiple long correlation sequences, can be employed to achieve significantly improved sensitivity relative to a short correlation sequence where the reduction in sensitivity can be predicted using the sinc function.

Referring now to FIG. 13, in current practice, the Doppler effect is often compensated in just one of the frequency domain or the time domain, without taking both into account. For example, when transmitted pulses are short, then frequency correction within a pulse may suffice. The other component of Doppler correction involves the slipping of chip (or bit) timing between pulses, as illustrated in FIG. 13. For example, after a pulse 1302 is transmitted, subsequent correction of Doppler time-error 1304 for subsequent pulses 1306, 1308 may be beneficial. With pulse-to-pulse timing corrected, it becomes possible to additively combine pulse-to-pulse correlation scores easily, thus improving sensitivity further, beyond the sensitivity attainable with single-pulse Doppler frequency error correction. Because exact time spacing between multiple pulses can be known a priori, based on a Doppler time correction, the non-coherent combining of individual pulse scores is achievable.

Because the amount of correlation needed to achieve desired sensitivity over a long pulse may require more processing horsepower than can be reasonably implemented, the benefit of repeated correlation using the same physical correlator for each individual pulse becomes more apparent. For example, with sufficient spacing between pulses a single correlator could be re-used for each subsequent pulse and the scores combined additively. With Doppler timing correction, the expected arrival time for each pulse can be known precisely and additive correlation can be used to significantly improve sensitivity. Whether coherent or non-coherent, such sparse pulse correlation involves little additional hardware or processing resources beyond the resources needed for single-pulse correlation, yet such sparse pulse correlation can yield significant additional sensitivity improvement.

In some embodiments, also referring back to FIG. 1, the system (e.g., the multi-node network 100) may include a transmitter node 102 and a receiver node 104. Each node of the transmitter node 102 and the receiver node 104 may include a communications interface 110 including at least one antenna element 112 and a controller operatively coupled to the communications interface, the controller 106 including one or more processors. The transmitter node 102 and the receiver node 104 may be time synchronized to apply Doppler corrections to said node's own motions relative to a stationary common inertial reference frame. The stationary common inertial reference frame may be known to the transmitter node 102 and the receiver node 104 prior to the transmitter node 102 transmitting signals to the receiver node 104 and prior to the receiver node 104 receiving the signals from the transmitter node 102. In some embodiments, the system is a mobile ad-hoc network (MANET) comprising the transmitter node 102 and the receiver node 104.

In some embodiments, the transmitter node 102 may be configured to apply the Doppler corrections relative to the stationary common inertial reference frame for a plurality of (e.g., some or all) azimuthal angles across a multi-pulse Doppler group such that each direction along one of the plurality of the azimuthal angles has a zero or near-zero Doppler time interval that would be known to the receiver node based on the time synchronization. The receiver node 104 may be configured to apply the Doppler corrections relative to the stationary common inertial reference frame for the plurality of the azimuthal angles across the multi-pulse Doppler group. The receiver node 104 may be configured to apply the Doppler corrections in an inverse fashion as compared to the transmitter node's 102 application of the Doppler corrections. The receiver node 104 may be further configured to receive a zero or near-zero Doppler pulse along a zero or near-zero Doppler path from the transmitter node 102 to the receiver node 104 with known time intervals. For example, a near-zero Doppler pulse may be a pulse of the multi-pulse Doppler group that is closest to a hypothetical zero Doppler pulse.

In some embodiments, the Doppler corrections are in both of the frequency domain and the time domain. In some embodiments, the zero or near-zero Doppler path is unknown to the transmitter node 102 and the receiver node 104 prior to transmission of the multi-pulse Doppler group. In some embodiments, the receiver node 104 is further configured to coherently detect across relatively long correlation sequences (e.g., as compared to relatively shorter correlation sequences). In some embodiments, with time corrected pulse-to-pulse, pulse-to-pulse Doppler dispersion is non-existent. In some embodiments, based at least on the non-existent pulse-to-pulse Doppler dispersion, the receiver node 104 has an increased sensitivity of signals from the transmitter node 102 as compared to a sensitivity of signals when the receiver node 104 experiences pulse-to-pulse Doppler dispersion. In some embodiments, based at least on the non-existent pulse-to-pulse Doppler dispersion, the receiver node 104 is further configured for deep-noise detection. Deep-noise discovery, as used herein, refers to finding signals so buried under noise that signal power is less than, for example, 1 percent of noise power (an equivalent signal-to-noise ratio (SNR) can be stated as −20 decibels (dB)). Employing this technique appears useful for very low SNR conditions where signal power levels of 0.1%, 0.01% or less (relative to noise) may be common. In some embodiments, the receiver node 104 is further configured to correct Doppler time-error for subsequent pulses. In some embodiments, the receiver node 104 is further configured to additively combine pulse-to-pulse correlation scores to further improve sensitivity of the signals from the transmitter node 102.

In some embodiments, the stationary common inertial reference frame is a two-dimensional (2D) stationary common inertial reference frame or a three-dimensional (3D) stationary common inertial reference frame.

In some embodiments, the at least one antenna element 112 of the transmitter node 102 comprises at least one of at least one directional antenna element or at least one omnidirectional antenna element. In some embodiments, the at least one antenna element 112 of the receiver node 104 comprises at least one of at least one directional antenna element or at least one omnidirectional antenna element.

Some embodiments solve a well-known, long-standing problem in communications systems. For example, some embodiments may employ Doppler-nulling, long correlation sequences, geometry and timing to facilitate rapid deep-noise acquisition of signals. Historically, high-Doppler signals have been difficult to acquire, even for modest sensitivity levels and acquisition times.

Traditionally, achieving deep-noise performance requires long correlation sequence length. Unfortunately, both Doppler magnitude and available processing resources tend to limit practical correlation length which can be implemented. Some embodiments outlined herein circumvent such limitations to a large extent. For example, a sparse-pulse acquisition approach presented above first applies Doppler frequency-shift correction for a single pulse to achieve high pulse acquisition sensitivity and then applies pulse-to-pulse Doppler time-shift correction to extend sensitivity looking across multiple pulses.

In some embodiments, with both Doppler frequency shift and time shift corrected within specific intervals known to both transmitter and receiver a priori, the receiver can employ coherent detection across multiple long correlation sequences. When Doppler time shift is corrected on a pulse-to-pulse basis, no pulse-to-pulse time dispersion exists, thus allowing for simple yet powerful deep-noise detection using relatively simple hardware and processing.

Some embodiments benefit both omni and directional systems. In some cases, sensitivity improvements may be improved by more than an order of magnitude. In addition, directional systems may experience corresponding improvement in another important dimension—discovery time can be correspondingly reduced along with sensitivity increases.

Some embodiments may be configured for rapid deep-noise acquisition and discovery, which may be a differentiating capability (over existing systems) for emerging low-observable, wideband or directional waveforms.

Unreliable discovery and acquisition of directional, wideband and low observable waveforms has at times resulted in significant failures. Some embodiments include a high-reliability solution. Increased performance in signal discovery and acquisition may enable reduced observability, increased bandwidth, and/or faster directional network discovery.

CONCLUSION

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

We claim:

1. A receiver (Rx) node comprising:
a communications interface comprising at least one antenna element;
and
a controller operatively coupled to the communications interface, the controller including one or more processors, wherein the controller has information of own-node velocity and own-node orientation of the Rx node relative to a stationary common inertial reference frame;
wherein the Rx node is in motion relative to at least one source node, the common reference frame known to the Rx node and to the source node prior to the Rx node receiving transmissions from the source node;
wherein the Rx node is time synchronized to apply one or more Doppler corrections associated with the Rx node's own motions relative to the common reference frame,
wherein the Rx node is further configured to receive at least one zero or near-zero Doppler pulse along a zero or near-zero Doppler path from the source node to the Rx node within known time intervals, the at least one zero or near-zero Doppler pulse associated with a correlation sequence of S symbols, wherein S is an integer, the correlation sequence uniquely identifying the source node;
wherein the Rx node further includes a correlator comprising a set of N sub-correlators, wherein N is an integer not more than S, wherein the correlation sequence comprises N sub-sequences, each sub-correlator of the set of N sub-correlators configured to:
receive the correlation sequence as a sequence of the N sub-sequences;
and
provide to the correlator, for each of the N sub-sequences, a delay value indicative of the receipt of the corresponding sub-sequence;
and
wherein the correlator is configured to output, based on the received delay values from each sub-correlator:
the decoded correlation sequence;
and
a cumulative delay value corresponding to the decoded correlation sequence, the cumulative delay value associated with a Doppler time error based on the received delay values from each sub-correlator.

2. The Rx node of claim 1, wherein the N sub-sequences include at least two sub-sequences having an unequal symbol length.

3. The Rx node of claim 1, wherein the correlation sequence is one of a set of N! possible correlation sequences.

4. The Rx node of claim 1, wherein the one or more Doppler corrections are in both of the frequency domain and the time domain.

5. The Rx node of claim 1, wherein the zero or near-zero Doppler path is unknown to the source node and the Rx node prior to receipt of the at least one zero or near-zero Doppler pulse.

6. The Rx node of claim 1, wherein the common reference frame is a two-dimensional (2D) stationary common inertial reference frame.

7. The Rx node of claim 1, wherein the common reference frame is a three-dimensional (3D) stationary common inertial reference frame.

8. The Rx node of claim 1, wherein the at least one antenna element comprises at least one of a directional antenna element or an omnidirectional antenna element.

9. A system, comprising:
a transmitter (Tx) node and a receiver (Rx) node, wherein each node of the Tx node and the Rx node comprises:
a communications interface including at least one antenna element;
and
a controller operatively coupled to the communications interface, the controller including one or more processors, wherein the controller has information of own-node velocity and own-node orientation;
wherein each node of the Tx node and the Rx node are in motion relative to each other;

wherein each node of the Tx node and the Rx node are time synchronized to apply one or more Doppler corrections associated with said node's own motions relative to a stationary common reference frame, the common reference frame known to the Tx node and the Rx node prior to the Tx node transmitting signals to the Rx node and prior to the Rx node receiving the signals from the Tx node;

wherein the Tx node is configured to apply the one or more Doppler corrections relative to the common reference frame for a plurality of azimuthal angles across a multi-pulse Doppler group, such that each direction corresponding to an azimuthal angle of the multi-pulse Doppler group is associated with a zero or near-zero Doppler time error known to the Rx node based on the time synchronization;

wherein the Rx node is configured to apply the one or more Doppler corrections in an inverse fashion relative to the Tx node's application of the one or more Doppler corrections;

wherein the Rx node is further configured to receive at least one zero or near-zero Doppler pulse along a zero or near-zero Doppler path from the Tx node to the Rx node within known time intervals, the at least one zero or near-zero Doppler pulse associated with a correlation sequence of S symbols, wherein S is an integer, the correlation sequence uniquely identifying the Tx node;

wherein the Rx node further includes a correlator comprising a set of N sub-correlators, wherein N is an integer not more than S, wherein the correlation sequence comprises N sub-sequences, each sub-correlator of the set of N sub-correlators configured to:

receive the correlation sequence as a sequence of the N sub-sequences;
and
provide to the correlator, for each of the N sub-sequences, a delay value indicative of the receipt of the corresponding sub-sequence;
and
wherein the correlator is configured to output, based on the received delay values from each sub-correlator:

the decoded correlation sequence;
and
a cumulative delay value corresponding to the decoded correlation sequence, the cumulative delay value associated with a Doppler time error based on the received delay values from each sub-correlator.

10. The system of claim 9, wherein the N sub-sequences include at least two sub-sequences having an unequal symbol length.

11. The system of claim 9, wherein the correlation sequence is one of a set of N! possible correlation sequences.

12. The system of claim 9, wherein the one or more Doppler corrections are in both of the frequency domain and the time domain.

13. The system of claim 9, wherein:
the one or more Doppler corrections for the plurality of azimuthal angles across the multi-pulse Doppler group are associated with the frequency domain;
and
the one or more Doppler corrections associated with the at least one zero or near-zero Doppler pulse along the zero or near-zero Doppler path are associated with the time domain.

14. The system of claim 9, wherein the zero or near-zero Doppler path is unknown to the Tx node and the Rx node prior to transmission of the multi-pulse Doppler group.

15. The system of claim 9, wherein the common reference frame is a two-dimensional (2D) stationary common inertial reference frame.

16. The system of claim 9, wherein the common reference frame is a three-dimensional (3D) stationary common inertial reference frame.

17. The system of claim 9, wherein:
the at least one antenna element of the Tx node comprises at least one of a directional antenna element or an omnidirectional antenna element;
and
wherein the at least one antenna element of the Rx node comprises at least one of a directional antenna element or an omnidirectional antenna element.

* * * * *